United States Patent [19]

Fukasawa et al.

[11] Patent Number: 5,520,594

[45] Date of Patent: May 28, 1996

[54] CONTROL SYSTEM FOR AUTOMOTIVE VEHICLE EQUIPPED WITH AUTOMATIC TRANSMISSION

[75] Inventors: Osamu Fukasawa, Obu; Mitsuo Hara, Haguri-gun, both of Japan

[73] Assignee: Nippondenso Co., Ltd., Kariya, Japan

[21] Appl. No.: 384,003

[22] Filed: Feb. 6, 1995

[30] Foreign Application Priority Data

Feb. 7, 1994 [JP] Japan ................................. 6-013763
Feb. 22, 1994 [JP] Japan ................................. 6-024525

[51] Int. Cl.⁶ .................................................. B60K 41/02
[52] U.S. Cl. ........................... 477/173; 477/166; 477/181
[58] Field of Search ................................. 477/62, 73, 166, 477/168, 173, 181

[56] References Cited

U.S. PATENT DOCUMENTS

| | | | |
|---|---|---|---|
| 4,484,497 | 11/1984 | Hibino | 477/181 X |
| 4,503,956 | 3/1985 | Suzuki et al. | |
| 4,711,333 | 12/1987 | Okamura | 477/170 X |
| 4,716,999 | 1/1988 | Tezuka et al. | 477/181 X |
| 5,010,863 | 4/1991 | Ishida et al. | 477/181 X |
| 5,385,517 | 1/1995 | Hara et al. | 477/181 X |

FOREIGN PATENT DOCUMENTS

| | | |
|---|---|---|
| 60-35147 | 2/1985 | Japan . |
| 61-184269 | 8/1986 | Japan . |
| 63-4061 | 1/1988 | Japan . |
| 336554 | 4/1991 | Japan . |
| 4370465 | 12/1992 | Japan . |

Primary Examiner—Charles A. Marmor
Assistant Examiner—Peter Kwon
Attorney, Agent, or Firm—Cushman, Darby & Cushman

[57] ABSTRACT

In order to prevent occurrence of engine stall even when a quick braking is made in a state where a torque converter of an automatic transmission is locked up, the torque converter is locked up in accordance with a throttle opening degree and a vehicle speed, and the lock-up is released at least when the braking operation is carried out. The opening degree B of an idle speed control valve (ISCV) for bypassing a throttle valve simultaneously with the lock-up is set, and the opening degree B is set as an actual control opening degree IV of ISCV when the opening degree B is larger than the opening degree IAV of ISCV which is set in accordance with the load of an engine. When the release of the lock-up is started, the actual control opening degree IV is gradually reduced to the opening degree IAV by a prescribed attenuation amount K. As a result, the engine stall due to a response delay to the release of the lock-up clutch can be prevented.

12 Claims, 19 Drawing Sheets

CONTROL SYSTEM FOR AUTOMOTIVE VEHICLE EQUIPPED WITH AUTOMATIC TRANSMISSION

BACKGROUND OF THE INVENTION

1. Field of the Invention

This invention relates to a control system for an automotive vehicle equipped with an automatic transmission.

2. Related Art

It has been conventionally utilized in an automatic transmission for an automotive vehicle that a lock-up clutch is provided in a torque converter to mechanically connect the input and output sides of the torque converter to each other, and the lock-up clutch is jointed under a prescribed driving condition to prevent reduction in power transmission efficiency and thus aim at improving fuel consumption.

In addition, in order to further improve the fuel consumption, it has been considered that the lock-up clutch is also jointed at its coasting drive time at which an acceleration pedal is fully closed to gradually reduce engine rotation, thereby lengthening a so-called fuel cut period for which fuel supply to an internal combustion engine is cut when a throttle valve is fully closed and an engine rotating number is above a predetermined value.

However, if the lock-up clutch is set to the joint state (lock-up state) when a vehicle coasts as described above, the rotational speed of driving wheels would be quickly reduced when a driver jams the brakes on, so that engine stall is induced.

In order to solve the above problem, Japanese Laid-open Patent Application No. 63-4061 or Japanese Laid-open Patent Application No. 4-370465 proposes a device in which the deceleration speed of a vehicle is detected on the basis of brake fluid pressure or the like and the lock-up (joint of the lock-up clutch) of the torque converter is released when the deceleration value exceeds a predetermined value.

However, the above conventional device has the following problems.

Ordinarily, the lock-up clutch is controlled with hydraulic pressure which is obtained by actuating a solenoid valve, and there is a time lag from the time when the activation of the solenoid valve is started until the time when the joint of the lock-up clutch is actually released. Accordingly, when a driver quickly jams the brakes on, the engine stall finally occurs due to a response delay until the lock-up clutch is released.

For general automotive vehicles, a braking power is set to be stronger for front-wheel brakes than for rear-wheel brakes, and thus the driving wheels are braked by the stronger front-wheel brakes in a so-called FF vehicle (front engine and front drive vehicle). Therefore, the engine stall is more liable to occur in the FF vehicle. On the other hand, even in a so-called FR vehicle (front engine and rear drive vehicle), the release of the lock-up clutch is delayed on a road having low friction coefficient on which the wheels of a vehicle are liable to be locked at its braking time, so that the engine stall finally occurs.

SUMMARY OF THE INVENTION

A first object of the present invention is to provide a control system for an automotive vehicle equipped with an automatic transmission in which occurrence of engine stall can be perfectly prevented even if a driver jams the brakes on when a torque converter of the automatic transmission is in a lock-up state.

A second object of the present invention is to provide a control system for an automotive vehicle equipped with an automatic transmission which is capable of ensuring drivability, and in which after a lock-up mechanism is set to a joint state under a prescribed condition, the joint state of the lock-up mechanism can be released at the optimum timing in accordance with any driving condition and any driving environment, and a fuel cut period can be suitably extended (lengthened).

In the control system for the automotive vehicle equipped with the automatic transmission according to the present invention, as shown in FIG. 1A, braking operation detecting means detects a step-on operation of a braking pedal, and lock-up control means outputs a lock-up instruction to an automatic transmission under a prescribed driving condition to lock up the torque converter of the automatic transmission. In addition, at least when the step-on operation of the braking pedal is detected by the braking operation detecting means, a lock-up release instruction is output to the automatic transmission to release the lock-up of the torque converter. Thereafter, air suction amount increasing means increases an air suction amount of an internal combustion engine in response to the lock-up instruction of the lock-up control means by a prescribed amount, and the increase of the air suction amount is stopped when a prescribed time elapses after the lock-up release instruction is output.

That is, in the control system for the automotive vehicle equipped with the automatic transmission, the lock-up of the torque converter is released when the braking pedal is stepped on. In this case, the air suction amount of the internal combustion engine is beforehand increased by a prescribed amount before the release of the lock-up is started, thereby continuing the increase of the air suction amount from the time when the release of the lock-up is started until the time when the prescribed time elapses. Accordingly, for example when the braking pedal is stepped on in a state where the torque converter of the automatic transmission is locked up and the rotating number of the internal combustion engine is below a predetermined value, that is, no fuel cut is not carried out, the output power of the internal combustion engine is beforehand increased in accordance with the increase of the air suction amount before the release of the lock-up is started. Therefore, even when there is a time lag from the step-on time of the braking pedal until the release of the lock-up, occurrence of the engine stall can be prevented.

Furthermore, even when the torque converter of the automatic transmission is locked up and the rotating number of the internal combustion engine is above a predetermined value, that is, the fuel cut is carried out, the air suction amount of the internal combustion engine has been already increased at the time when the release of the lock-up is started in accordance with the step-on of the braking pedal. Therefore, when the rotating number of the internal combustion engine is reduced and the fuel cut is released, the output power of the internal combustion engine increases to a value higher than the output power at an idling time. Therefore, even when there is a time lag from the quick step-on operation of the breaking pedal until the release of the lock-up of the torque converter, occurrence of the engine stall can be perfectly prevented.

According to the control system for the automotive vehicle equipped with the automatic transmission, the lock-up state is kept without inducing the engine stall until the step-on of the braking pedal is performed, so that the fuel cut period can be lengthened and thus the fuel consumption can be improved.

In the control system for the automotive vehicle as described above, the air suction amount increasing means is preferably designed to control the opening and closing operation of at least one of a throttle valve of an internal combustion engine, an idle speed control valve which is disposed in a bypass for bypassing the throttle valve, a purge control valve which is disposed in an introducing passage for introducing fuel vapor gas occurring in a fuel tank into an air suction pipe of the internal combustion engine, and an EGR valve which is disposed in a recirculation passage for recirculating exhaust gas of the internal combustion engine into the air suction pipe.

Accordingly, the air suction amount of the internal combustion engine can be increased without additionally providing a special mechanism.

Furthermore, as indicated by a dotted line of FIG. 1A, the control system for the automotive vehicle equipped with the automatic transmission as described above preferably includes idle rotation control means for controlling, in accordance with the driving condition of the internal combustion engine, the opening and closing operation of the idle speed control valve which is provided in the bypass for bypassing the throttle valve of the internal combustion engine, and further the air suction amount increasing means preferably includes opening-degree setting means, and opening and closing control means.

The opening-degree setting means sets the opening degree of the idle speed control valve on the basis of the lock-up instruction of the lock-up control means. The opening and closing control means compares the opening degree set by the opening degree setting means and the control opening degree of the idle speed control valve which is controlled by the idle rotation control means, and when the opening degree set by the opening degree setting means is larger than the control opening degree, the opening and closing control means controls the closing and opening operation of the idle speed control valve so that its control opening degree is equal to the set opening degree, thereby increasing the air suction amount.

That is, the idle rotation control means controls the opening and closing operation of the idle speed control valve in accordance with the driving condition of the internal combustion engine to control the air suction amount of the internal combustion engine to a proper value. When the control degree is larger than the opening degree set by the opening degree setting means, the engine stall which would occur at the lock-up release time can be prevented without further increasing the air suction amount. Therefore, the air suction amount increasing means is designed not to work at this time. Accordingly, the proper amount of sucked air can be supplied to the internal combustion engine at all times.

More preferably, as shown in FIG. 1B, the braking operation detecting means detects the step-on operation of the braking pedal, and the lock-up control means outputs a lock-up instruction to the automatic transmission under a prescribed driving condition to set the torque converter of the automatic transmission to a lock-up state and outputs a lock-up release instruction to the automatic transmission to release the lock-up of the torque converter at least when the step-on operation of the brake pedal is detected by the breaking operation detecting means. Therefore, when the lock-up release instruction is output from the lock-up control means, air-fuel mixture increasing means increases the amount of air-fuel mixture supplied to the internal combustion engine for a predetermined time. That is, when the braking pedal is stepped on to start the release of the lock-up, the air-fuel mixture in the internal combustion engine is directly increased.

Accordingly, since the output power of the internal combustion engine increases simultaneously with the step-on operation of the braking pedal, occurrence of the engine stall can be prevented even when there is a time lag in release of the lock-up.

Furthermore, the air-fuel mixture increasing means preferably controls the opening and closing operation of at least one of a purge control valve which is disposed in an introducing passage for introducing fuel vapor gas occurring in a fuel tank into an air suction pipe of the internal combustion engine, and an EGR valve which is disposed in a recirculation passage for recirculating exhaust gas of the internal combustion engine into the air suction pipe. Accordingly, the air-fuel mixture can be increased with no additive special mechanism.

Still furthermore, as indicated by a one-dotted line of FIG. 1A and 1B, the control system of the present invention is preferably equipped with judging means for judging whether a road surface on which the vehicle runs currently is slippery, and actuation restricting means for actuating the air suction increasing means or the air-fuel mixture increasing means only when the road surface is judged to be slippery by the judging means. Accordingly, the increase of the air suction amount or the air-fuel mixture is performed only when the vehicle runs on a road surface on which the wheels of the vehicle are liable to be locked at the step-on time of the breaking pedal and the engine stall is liable to occur due to the response delay of the lock-up release, whereby the fuel consumption of the internal combustion engine or an adverse effect on emission can be suppressed to the minimum value.

DETAILED DESCRIPTION OF THE PREFERRED EMBODIMENTS

Preferred embodiments according to the present invention will be described with reference to the accompanying drawings.

Figure 1A:
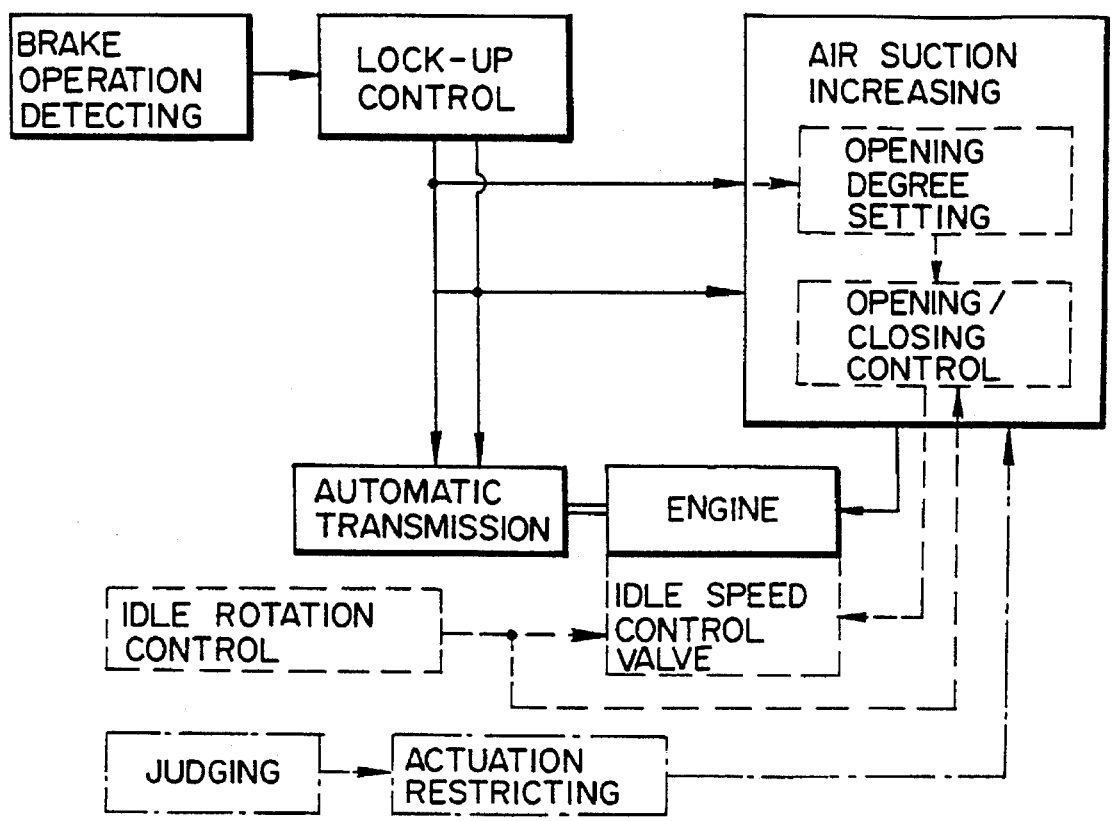
FIGS. 1A and 1B are a block diagram showing the general construction of the present invention.
Figure 1B:
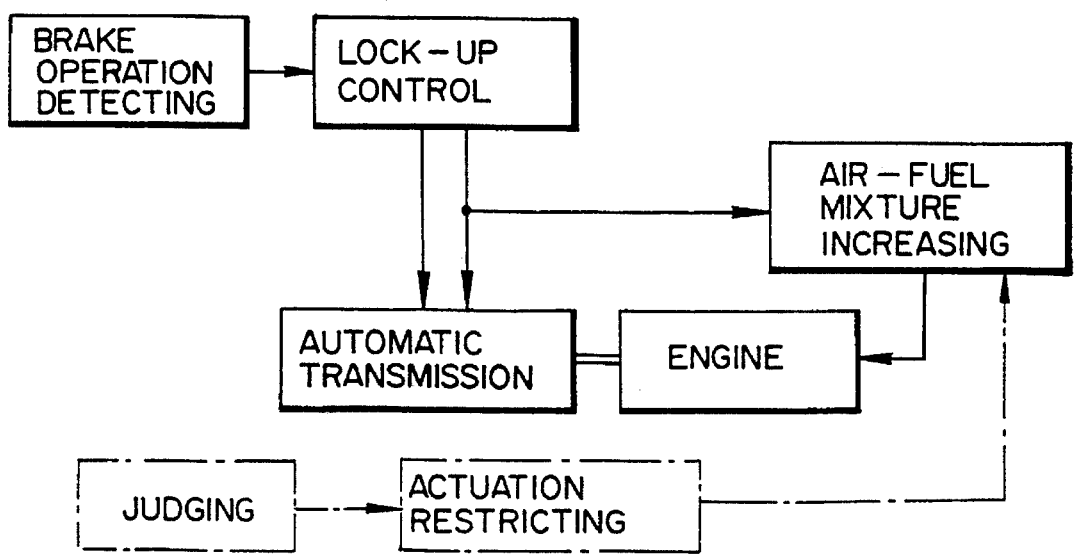
Figure 2:
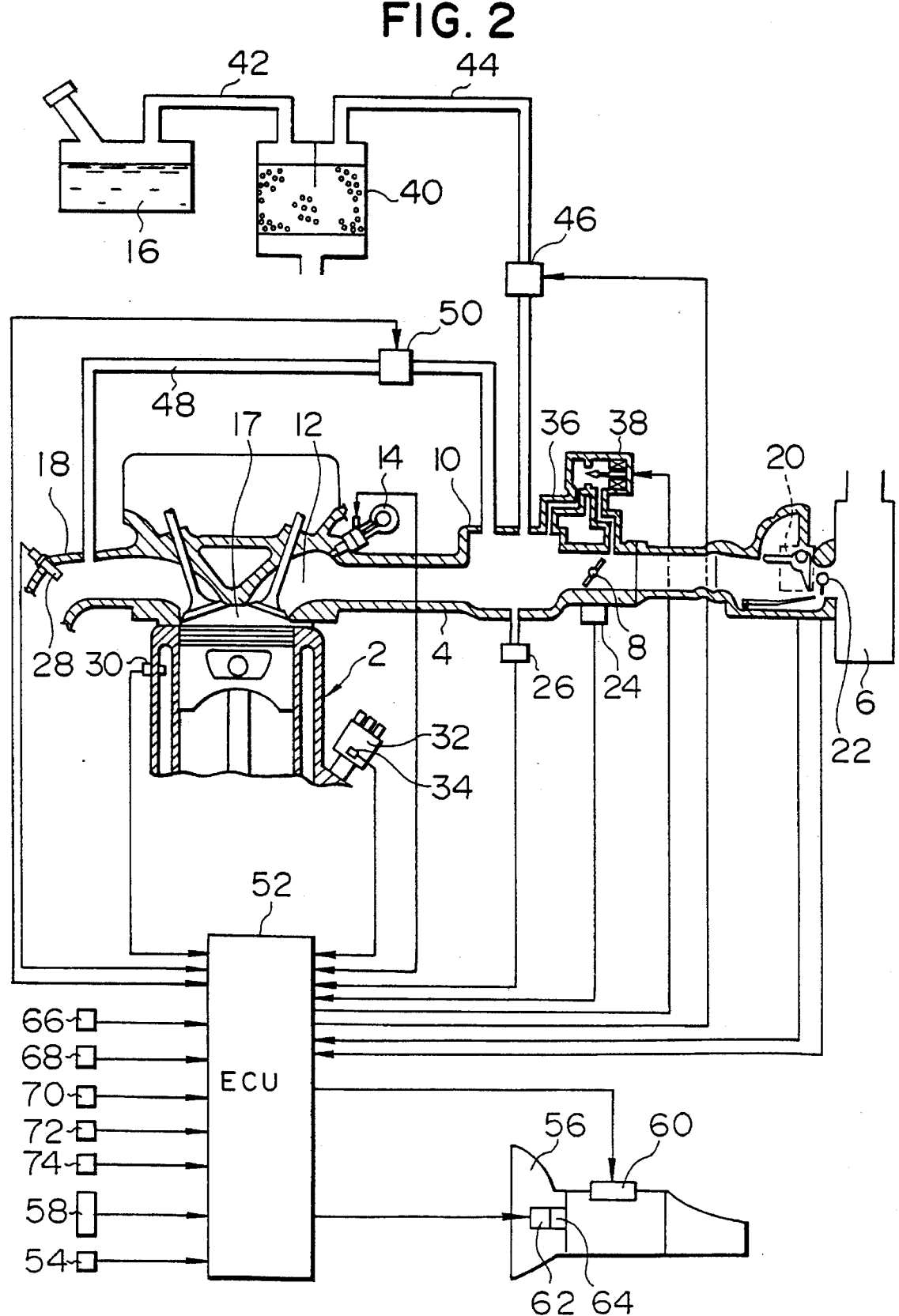
FIG. 2 is a schematic diagram showing a system construction of a first embodiment of the present invention.

FIG. 2 is a schematic diagram showing the construction of an internal combustion engine 2 for a vehicle to which the present invention is applied according to the first object of the present invention, and peripheral equipments thereof.

As shown in FIG. 2, air passing through an air cleaner 6 is supplied into an air suction pipe 4 of the internal combustion engine 2, and the flow amount of the air is controlled by a throttle valve 8 which is interlocked with an acceleration pedal (not shown) operated by a driver for a vehicle. The air is passed through a surge tank 10 which is formed at the downstream side of the throttle valve 8 of the air suction pipe 4, and guided to a suction port 12 of the internal combustion engine 2. On the other hand, a fuel injection valve 14 is provided for each cylinder at the downstream side of the surge tank 10 of the air suction pipe 4, and fuel is supplied from a fuel tank 16 through a fuel pipe (not shown) to the fuel injection valve 14. Accordingly, the fuel is injected from the fuel injection valve 14 to the suction port 12 to form air-fuel mixture, and the air-fuel mixture is guided to a combustion chamber 17 of the internal combustion engine 2. The air-fuel mixture is burned, and exhaust gas produced through the burning process is discharged through an exhaust pipe 18 to the outside air.

At this time, an air flow meter 20 which is provided between the air cleaner 6 and the throttle valve 8 outputs an analog signal representing the air suction amount, and a suction air temperature sensor 22 which is disposed in a housing provided to the air flow meter 20 outputs an analog signal representing the suction air temperature. Furthermore, a throttle sensor 24 provided to the throttle valve 8 outputs an analog signal representing the opening degree of the throttle valve 8 (throttle opening degree), and also outputs an on-off signal from an idle switch for detecting a fully closing state of the throttle valve 8. In addition, a suction pressure sensor 26 for outputting an analog signal representing the air suction pipe pressure is provided to the surge tank 10.

On the other hand, an air-fuel ratio sensor 28 which is secured to the exhaust pipe 18 outputs an analog signal representing the residual oxygen concentration in the exhaust gas. A water-temperature sensor 30 which is secured to a water jacket of the internal combustion engine 2 outputs an analog signal representing a cooling water temperature of the engine. In a distributor 32 for distributing a high voltage to ignition plugs (not shown) in timed relation with the rotating (reciprocating) operation of the internal combustion engine is provided a crank angle sensor 34 for outputting a pulse signal at every prescribed crank angle.

A bypass 36 for bypassing the throttle valve 8 is formed in the air suction pipe 4, and an electromagnetic type idle speed control valve (hereinafter referred to as "ISCV") 38 for controlling the air suction amount separately from the throttle valve 8 is secured in the bypass 36.

Furthermore, in the fuel tank 16 is provided a conduit 42 for guiding fuel vapor gas in the fuel tank into a charcoal canister 40. The fuel vapor gas which is guided into the charcoal canister through the conduit 42 is adsorbed to activated charcoal stocked in the charcoal canister 40. The charcoal canister 40 is connected to a conduit 44, and the conduit 44 is connected through an electromagnetic-type purge control valve 46 to the surge tank 10. Accordingly, the fuel vapor gas which occurs in the fuel tank 16 is guided through the conduit 42, and temporarily adsorbed and held in the charcoal canister 40. Thereafter, the fuel vapor gas which is adsorbed and held in the charcoal canister 40 is guided through the conduit 44 and the purge control valve 46 into the surge tank 10.

Furthermore, the exhaust pipe 18 is connected to a recirculation pipe 48 through which the exhaust gas is recirculated to the surge tank 10, and an electromagnetic-type exhaust gas re-circulating control valve (hereinafter referred to as "EGR valve") 50 is mounted in the recirculation pipe 48.

The detection signals of the various sensors such as the air flow meter 20, the suction air temperature sensor 22, the throttle sensor 24, the suction pressure sensor 26, the air/fuel ratio sensor 28, the water temperature sensor 30, the crank angle sensor 34, etc. are input to an electric control unit (hereinafter referred to as "ECU") 52.

The ECU 52 comprises a well-known microcomputer having a CPU, a ROM, a RAM, an I/O port, an A/D converter, etc., and it controls the internal combustion engine 2 and an automatic transmission equipped with a lock-up mechanism for transmitting the rotational power of the internal combustion engine 2 to driving wheels (not shown and hereinafter merely referred to as "automatic transmission") on the basis of the detection signals from a vehicle speed sensor 54 for outputting a pulse signal representing the vehicle speed, a shift switch 58 of the automatic transmission 56, etc.

The ECU 52 calculates a basic injection time T0 from an air suction amount Q which is detected on the basis of a signal from the air flow meter 20, and an engine speed or rotating number Ne which is detected on the basis of a signal from the crank angle sensor 34, further corrects the basic injection time T0 in accordance with the residual oxygen concentration the exhaust gas which is detected on the basis of a signal from the air-fuel ratio sensor 28 and the suction air temperature and the engine cooling water temperature which are detected on the basis of signals from the suction air temperature sensor 22, the water temperature sensor 30, etc., and drives the fuel injection valve 14 in accordance with the finally calculated injection time to inject the fuel into the internal combustion engine 2. The ECU 52 also carries out a so-called fuel cut control of stopping the fuel injection when the full closure of the throttle valve 8 is detected by the throttle sensor 24 and the engine rotating number Ne is above a predetermined value.

The ECU 52 calculates a target opening degree of the purge control valve 46 in accordance with the current fuel injection time, the engine rotating number Ne, etc. to control the opening and closing operation of the purge control valve 46 in accordance with the target opening degree, whereby the fuel vapor gas which is adsorbed and held in the charcoal canister 40 is introduced into the surge tank 10. Further, the ECU 52 calculates an exhaust gas recirculation rate (EGR rate) to the overall air suction amount Q on the basis of the engine rotating number Ne and the air suction pipe pressure which is detected on the basis of the signal from the suction pressure sensor 26 to control the opening and closing operation of the EGR valve 50 so that the opening degree of the EGR valve 50 is equal to the calculated EGR rate, whereby the exhaust gas is recirculated into the surge tank 10.

On the other hand, the ECU 52 drives a transmission solenoid 60 of the automatic transmission 56 to change gear on the basis of the throttle opening degree, the vehicle speed which is detected on the basis of the signal from the vehicle speed sensor 54, an instruction from the shift switch 58 which is operated by the driver of the vehicle, etc., and executes a lock-up control processing as described later to drive a lock-up solenoid 62, whereby a lock-up clutch 64 of the automatic transmission 56 is jointed or opened. When the lock-up clutch 64 is jointed, the input and output shafts of the torque converter (not shown) in the automatic transmission 56 are set to be directly jointed to each other (in a lock-up state).

In FIG. 2, reference numeral 66 represents a brake switch serving as braking operation detecting means which is switched on when the braking pedal is stepped on, reference numeral 68 represents an air conditioner switch for detecting actuation of a compressor for compressing refrigerant of an air conditioner installed on the vehicle, reference numeral 70 represents a detection switch for detecting actuation of a power steering by detecting a hydraulic pressure for the power steering, reference numeral 72 represents a current detector for detecting whether the total current value which is consumed in the vehicle due to actuation of various kinds of electrical loads exceeds a predetermined value, and reference numeral 74 represents a wiper switch which is provided to a front windshield glass of the vehicle and actuates a wiper (not shown).

Next, the lock-up control processing serving as the lock-up control means which is executed by the ECU 52 provided in the vehicle as described above will be described with reference to FIG. 3. The lock-up control processing is executed every predetermined time (for example, 4 ms). For convenience of description, FIG. 3 representatively shows the gear change of the automatic transmission 56 from a third gear speed to a fourth gear speed (over-drive).

Figure 3:
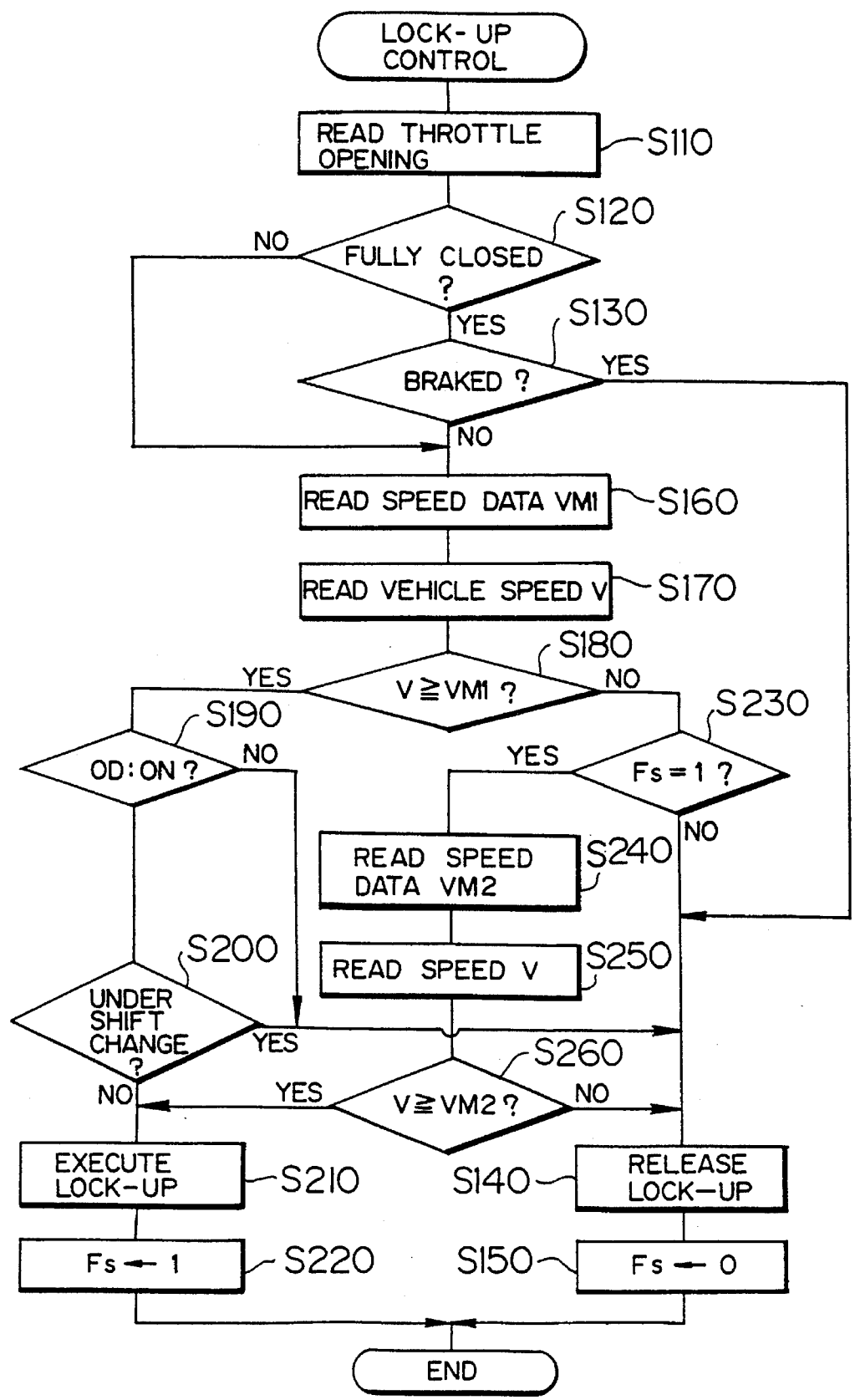
FIG. 3 is a flowchart for a lock-up control processing in the first embodiment.

As shown in FIG. 3, when the lock-up control processing is started, in step (hereinafter referred to as "S") 110, the throttle opening degree which is detected on the basis of the signal from the throttle sensor 24 is first read out, and then in S120 it is judged whether the throttle opening degree is fully closed. If the throttle opening degree is judged to be fully closed, it is judged in subsequent S130 whether the braking switch 66 is switched on. If the braking switch is judged to be switched on, it is judged that the braking pedal is stepped on, and the program goes to S140.

In S140, a lock-up release instruction is output to the lock-up solenoid 62 of the automatic transmission 56 to open the lock-up clutch 64, and in subsequent S150, "0" which indicates that the torque converter is not in the lock-up state is set to a lock-up flag Fs indicating whether the torque converter of the automatic transmission is in the lock-up state. Thereafter, the lock-up control processing is ended.

On the other hand, if it is judged in S130 that the braking switch is not on (that is, not braked), or if it is judged in S120 that the throttle opening degree is not fully closed, the program goes to S160.

Figure 4:
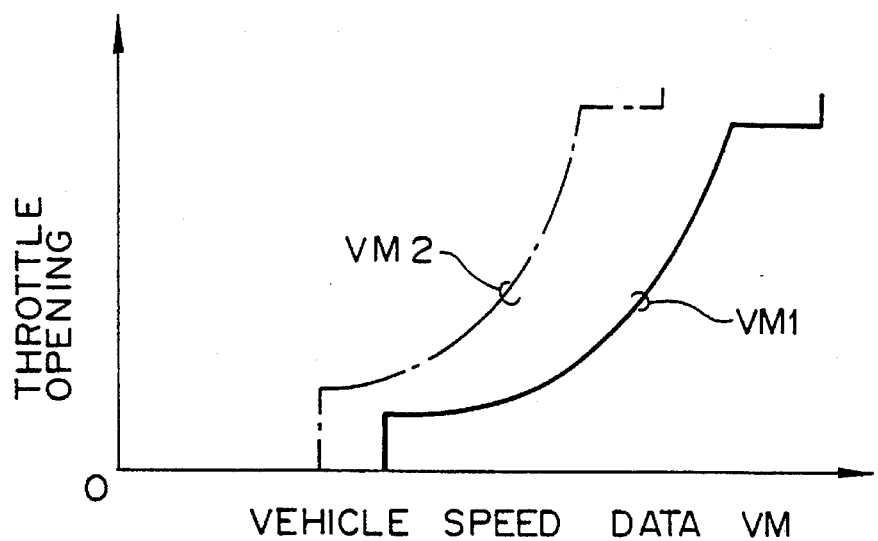
FIG. 4 is a diagram showing a data map used in the lock-up control processing.

In S160, as shown in FIG. 4, a lock-up actuating vehicle speed datum VM1 corresponding to the current throttle opening degree is read out from a data map in which a lock-up operating vehicle speed datum VM1 representing a vehicle speed at which the torque converter should be locked up and a lock-up releasing vehicle speed datum VM2 representing a vehicle speed at which the lock-up should be released are stored in correspondence with the throttle opening degree. The data map shown in FIG. 4 indicates the vehicle speed at which the lock-up operation from the third gear speed to the fourth gear speed and its release should be performed. The data map is set so that the lock-up can be performed at the fourth gear speed if the vehicle speed is above a predetermined value irrespective of the full closure of the throttle opening degree.

In subsequent S170, the current vehicle speed V which is detected on the basis of the signal from the vehicle speed sensor 54 is read in, and in subsequent S180 the current vehicle speed V and the lock-up operating vehicle speed VM1 which is read in in S160 are compared with each other. If the current vehicle speed V is judged to be higher than the lock-up operating vehicle speed datum VM1, it is judged in S190 whether an OD switch provided to the shift switch 58 is switched on. Through a driver's switching operation of the OD (overdrive) switch, the driver can set the shift-up from the third gear speed to the fourth gear speed.

If it is judged in S190 that the OD switch is on, it is judged in S200 whether the shift change (from the third gear speed to the fourth gear speed) of the automatic transmission 56 is being currently carried out (i.e., the automatic transmission is under a shift change state). If the automatic transmission is judged not to be under the shift change state, in S210, the lock-up instruction is output to the lock-up solenoid 62 of the automatic transmission 56 to joint the lock-up clutch 64, and in S220, "1" indicating that the torque converter is currently in the lock-up state is set to the lock-up flag Fs, thereafter ending the lock-up control processing.

If it is judged in S190 that the OD switch is not on, or if it is judged in S200 that the automatic transmission is under the shift change state, the processing of S140 and S150 are executed and then the lock-up control processing is ended.

On the other hand, if it is judged in S180 that the current vehicle speed V is lower than the lock-up operating vehicle speed datum VM1, the program goes to S230 to judge whether the lock-up flag Fs is equal to "1". If the lock-up flag Fs is judged to be "1", in S240 the lock-up releasing vehicle speed datum VM2 corresponding to the current throttle opening degree is read in from the data map shown in FIG. 4 in the same manner as S160.

Subsequently, in S250, the current vehicle speed V is read in, and then in S260 the current vehicle speed V and the lock-up releasing vehicle speed datum VM2 which is read in S240 are compared with each other. If the current vehicle speed V is higher than the lock-up releasing vehicle speed datum VM2, the processing of S210 and S220 is executed, and then the lock-up control processing is ended.

On the other hand, if it is judged S260 that the current vehicle speed V is lower than the lock-up releasing vehicle speed datum VM2, the processing of S140 and S150 is executed, and then the lock-up control processing is ended.

That is, in the lock-up control processing, when the current vehicle speed V is above the lock-up operating vehicle speed VM1 which is set in accordance with the throttle opening degree, the lock-up instruction is output to the lock-up solenoid 62 of the automatic transmission 56 to joint the lock-up clutch 64 (S160 to S220).

If the braking switch 66 is switched on (S130: YES), or if the vehicle speed V is reduced to a value which is smaller than the lock-up releasing vehicle speed datum VM2 set in accordance with the throttle opening degree or when the lock-up clutch 64 is jointed (S230: YES, S240, S250, S260: NO), the lock-up releasing instruction is output to the lock-up solenoid 62 to open the lock-up clutch 64 (S140, S150).

Next, the air suction amount correction processing which is executed by the ECU 52 will be described with reference to FIGS. 5 to 9. In the air suction amount correction processing, the amount of air flowing in the bypass 36 is controlled by controlling the opening and closing operation of the ISCV 38 to increase or decrease the air suction amount of the internal combustion engine 2 separately from the opening degree of the throttle valve 8 (throttle opening degree). This processing is executed every predetermined time (4 ms, for example) in parallel to the lock-up control processing as described above.

Figure 5:
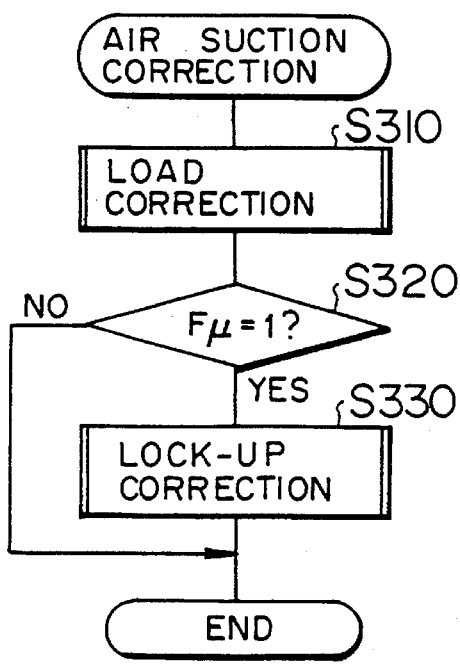
FIG. 5 is a flowchart for an air suction amount correction processing in the first embodiment.
Figure 7:
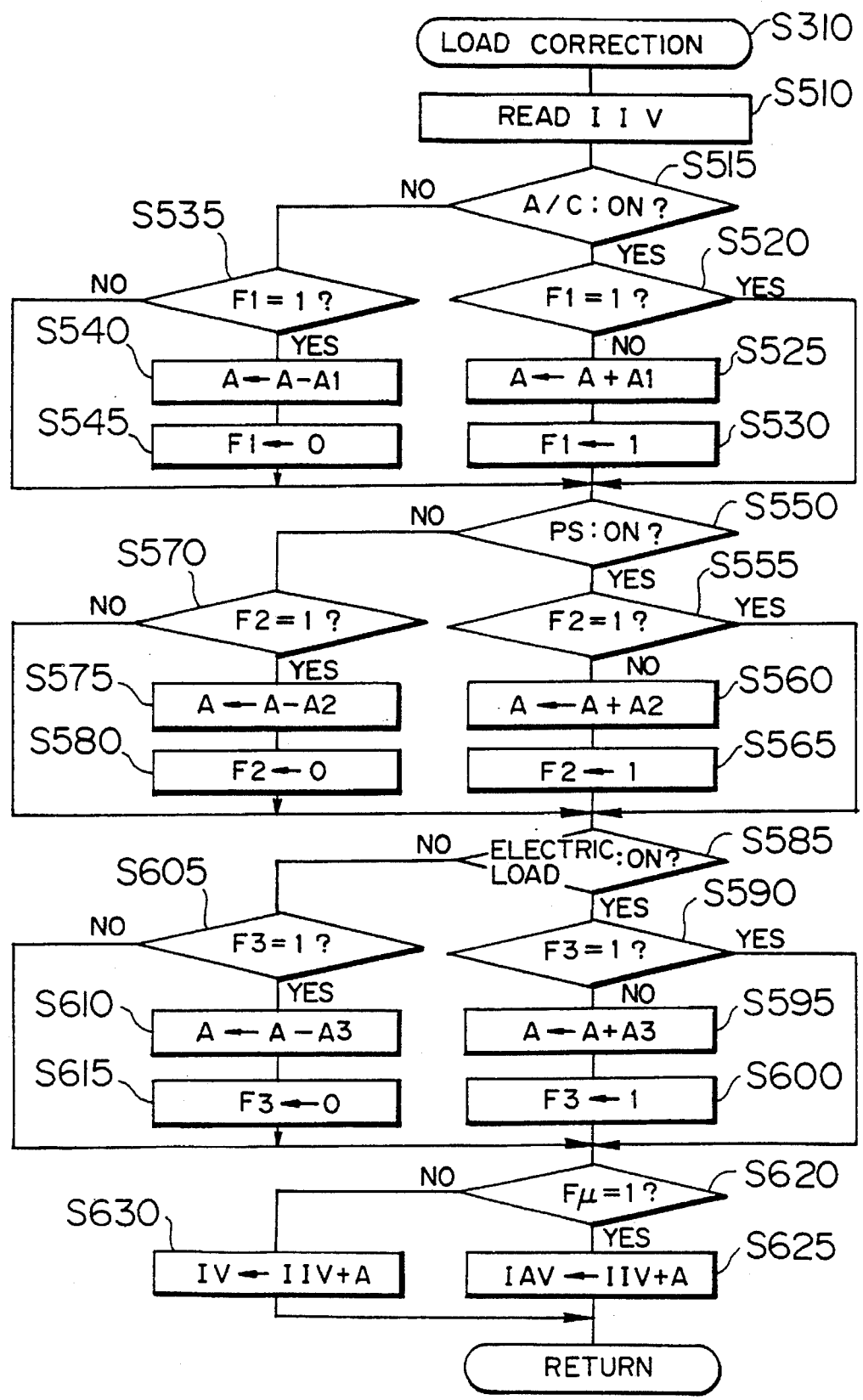
FIG. 7 is a flowchart for a load correction processing which is executed in the air suction amount correction processing.

As shown in FIG. 5, when the air suction amount correction processing is started, the load correction processing serving as the idle rotating control means is first executed in S310. In the load correction processing, the opening degree of the ISCV 38 is set in accordance with actuation of the refrigerant compressing compressor for the air conditioner installed in the vehicle, the power steering and various kinds of electrical loads, and it is executed as shown in FIG. 7.

When the load correction processing is ended, the following process serving as the operation restricting means is executed. That is, it is judged in S320 whether a low friction coefficient ($\mu$) road flag F$\mu$ representing whether a road surface on which the vehicle runs currently is slippery is equal to "1" indicating that the road surface is slippery. If the low $\mu$ road flag F$\mu$ is judged to be "1", in the lock-up correction processing serving as the air suction amount increasing means as described later (FIG. 8) is executed in S330. If the low $\mu$ road flag F$\mu$ is judged to be "0", the air suction amount correction processing is ended without executing the lock-up correction processing.

Figure 6:
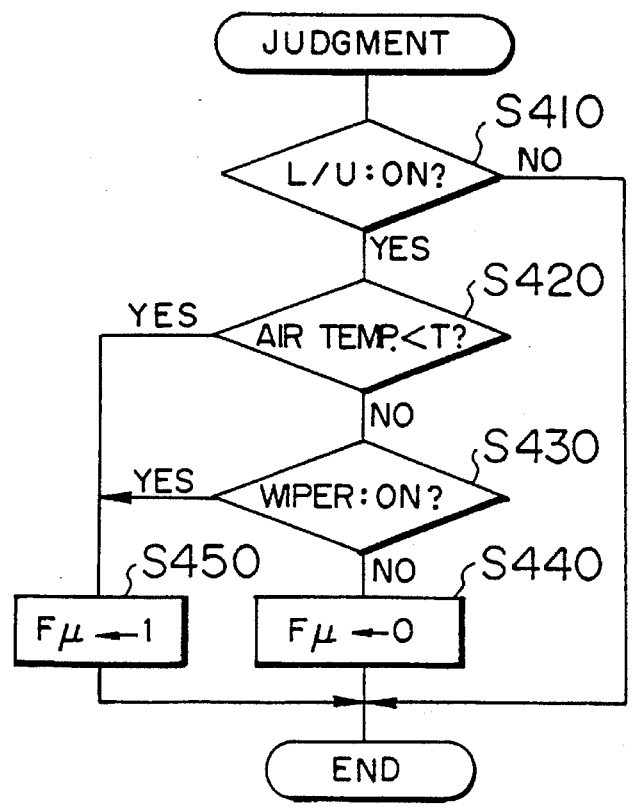
FIG. 6 is a flowchart for a judgment processing in the first embodiment.

Here, "1" or "0" is set to the low $\mu$ road flag f$\mu$ by a judgment processing serving as the judging means shown in FIG. 6. The judgment processing is executed every predetermined time in parallel to the air suction amount correction processing.

As shown in FIG. 6, in the judgment processing, it is judged in S410 whether the lock-up (L/U) instruction is currently made in the lock-up control processing. If the lock-up instruction is judged not to be made, the judgment processing is ended. On the other hand, if the lock-up instruction is judged to be made, the program goes to S420.

In S420, the current suction air temperature is detected on the basis of the signal from the suction air temperature sensor 22, and it is judged whether the detected temperature is lower than a predetermined temperature T. If the suction air temperature is judged not to be lower than the predetermined temperature T, it is judged in S430 whether the wiper switch for actuating the wiper of the vehicle is switched on. If the wiper switch 74 is judged not to be on, in S440, "0" indicating that the road surface on which the vehicle runs currently is not slippery is set to the low $\mu$ road flag F$\mu$.

On the other hand, if it is judged in S420 that the suction air temperature is lower than the predetermined temperature T, or if it is judged in S430 that the wiper switch 74 is on, "1" indicating that the road surface on which the vehicle runs currently is slippery is set to the low $\mu$ road flag F$\mu$, and then the judgment processing is ended.

That is, in the judgment processing, only at either a cold time when the suction air temperature is below the predetermined temperature T or a rainy time when the wiper is actuated, "1" is set to the low $\mu$ road flag F$\mu$ and the lock-up correction processing is executed in the air suction amount correction processing.

Here, the details of load correction processing which is executed in the air suction amount correction processing will be described with reference to FIG. 7.

Upon start of the execution of the load correction processing, in S510, the engine cooling water temperature is detected on the basis of the signal from the water temperature sensor 30, and a basic opening degree IIV of the ISCV 38 at the idling time is read out from the ROM in accordance with the detected engine cooling water temperature. The basic opening degree IIV is beforehand stored in the ROM as a value corresponding to the engine cooling water temperature.

Thereafter, it is judged in S515 whether an air conditioner (A/C) switch 68 is switched on. If the switch is judged to be on, it is judged in S520 whether "1" is set to a flag F1 representing that the amount has been already increased (hereinafter referred to as "increment-settled flag"). If the increment-settled flag F1 is judged not to be "1", in S525 the correction opening degree A of the ISCV 38 is added with a predetermined increment A1, and then "1" is set to the increment-settled flag F1 in S530.

On the other hand, if the air conditioner switch 68 is judged not to be on in S515, the program goes to S535 to judge whether the increment-settled flag F1 is equal to "1". If the increment-settled flag F1 is judged to be "1", the increment A1 is subtracted from the correction opening degree A of the ISCV 38 in S545, and then "0" is set to the increment-settled flag F1.

When "1" is set to the increment-settled flag F1 in S530, when "0" is set to the increment-settled flag F1 in S545, if the increment-settled flag F1 is judged to be "1" in S520, or if the increment-settled flag F1 is judged not to be "1" in S535, the program goes to S550.

Subsequently, it is judged whether a detection switch for detecting the actuation of the power steering is on. If the detection switch is judged to be on, it is judged in S555 whether the increment-settled flag F2 has been already equal to "1". If the increment-settled flag F2 is judged not to be "1", in S560 the correction opening degree A of the ISCV 38 is added with a predetermined increment A2, and then in S565 "1" is set to the increment-settled flag F2.

On the other hand, if in S550 the detection switch 70 is judged not to be on, the program goes to S570 to judge whether the increment-settled flag F2 is equal to "1". If the increment-settled flag F2 is judged to be "1", in S575 the increment A2 is subtracted from the correction opening degree A of the ISCV 38, and then "0" is set to the increment-settled flag F2.

When "1" is set to the increment-settled flag F2 in S565, when "0" is set to the increment-settled flag F2 in S580, if the increment-settled flag F2 is judged to be "1" in S555, or if the increment-settled flag F2 is judged not to be "1", the program goes to S585.

Thereafter, in S585, by judging whether the current detector 72 is on, it is judged whether the current value consumed in the vehicle exceeds a predetermined value due to the actuation of the various kinds of electric loads. If the current detector 72 is judged to on, it is judged in S590 whether an increment-settled flag F3 has been already equal to "1". If the increment-settled flag F3 is judged not to be "1", in S595 the correction opening degree A of the ISCV 38 is added with a predetermined increment A3, and then "1" is set to the increment-settled F3 in S600.

On the other hand, if in S585 the current detector 72 is judged not to be on, the program goes to S605 to judge whether the increment-settled flag F3 is equal to "1". If the judgment of "1" is made, in step S610 an increment A3 is subtracted from the correction opening degree A of the ISCV 38, and then in S615 "0" is set to the increment-settled flag F3.

When "1" is set to the increment-settled flag F3 in S600, when "0" is set to the increment-settled flag F3 in S615, when the increment-settled flag F3 is judged to be "1" in S590, or when the increment-settled flag F3 is judged not to be "1", the program goes to S620.

In S620, the value of the low μ road flag Fμ which is set in the judgment processing is identified. If it is "1", that is, when the lock-up correction processing as described later is executed, in S625, a value obtained by adding the correction opening degree A to the basic opening degree IIV is set as a load correction opening degree IAV.

On the other hand, if the low μ road flag Fμ is judged to be "0", the lock-up correction processing is not executed as described above, and thus the program goes to S630 to set the sum of the basic opening degree IIV and the correction opening degree A as an actual control opening degree IV for actually controlling the opening and closing operation of the ISCV 38, thereafter ending the load correction processing. If the actual control opening degree IV is set, a driving signal (duty driving signal or a step driving signal) corresponding to the actual control opening degree IV is output to the ISCV 38, thereby controlling the opening and closing operation of the ISCV 38.

That is, in the load correction processing, the basic opening degree IIV of the ISCV 38 is set in accordance with the engine cooling water temperature. In addition, the predetermined increment A1 is added to the correction opening degree A for correcting the basic opening degree IIV when the refrigerant compressing compressor of the air conditioner is actuated, the predetermined increment A2 is further added to the correction opening degree A when the power steering is actuated, and the predetermined increment A3 is further added to the correction opening degree when the consumed current of the electric loads exceeds the predetermined value. Accordingly, as the loads applied to the internal combustion engine 2 are increased, the set opening degree of the ISCV 38 increases, and thus the air suction amount of the internal combustion engine 2 increases. The increase of the air suction amount sets the fuel injection time to be longer by its increment, so that the output power of the internal combustion engine 2 increases.

Figure 8:
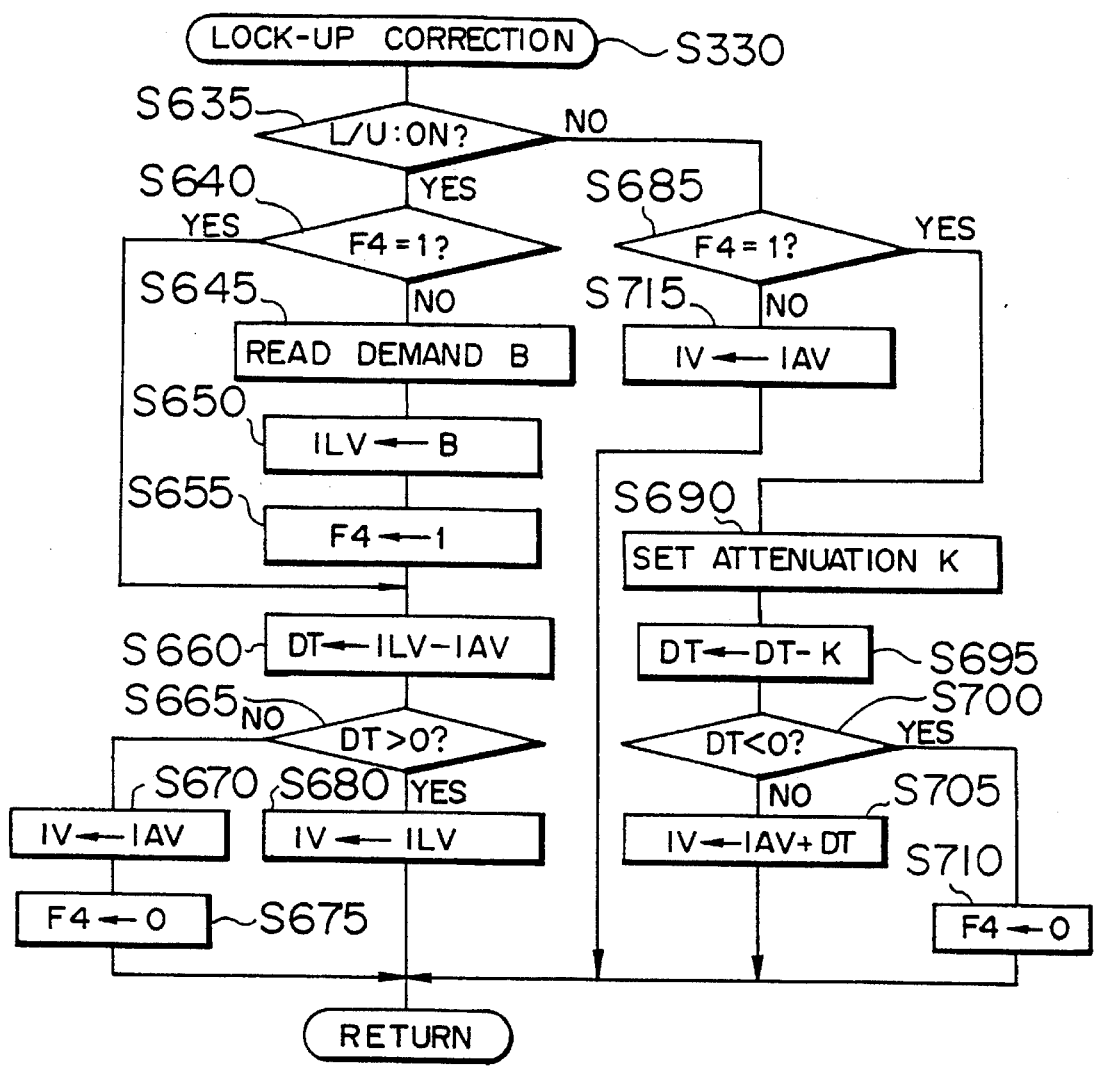
FIG. 8 is a flowchart for a lock-up correction processing which is executed in the air suction amount correction processing.

Next, the lock-up correction processing which is executed in the air suction amount correction processing will be described with reference to FIG. 8. As described above, the lock-up correction processing is executed after the load correction processing as described above if the low μ road flag Fμ which is set in the judgment processing is equal to "1".

Upon start of the execution of the lock-up correction processing, it is first judged in S635 whether the lock-up instruction is made in the lock-up control processing. If the lock-up instruction is judged to be made, the program goes to S640.

It is judged in S640 whether an increment-settled flag F4 has been already equal to "1". If the increment-settled flag F4 is judged not to be "1", a demanded opening degree B of the ISCV 38 is read out from the ROM in S645. The demanded opening degree B is beforehand stored in the ROM in accordance with the vehicle speed V and the engine rotating number Ne, and it is set to a larger value at a lower speed/lower rotating number. That is, since the engine stall is more liable to occur at the lock-up release time as the vehicle speed V is lower and the engine rotating number Ne is smaller, the opening degree of the ISCV 38 is set to be larger.

Thereafter, in S650, a processing serving as the opening degree setting means in which the read-in demanded opening degree B is set as a lock-up correction opening degree ILV is executed, and then in S655 "1" is set to an increment-settled flag F4.

If "1" is set to the increment-settled flag F4 in S655, or if the increment-settled flag F4 is judged to have been already equal to "1" in S640, the program goes to S660 to calculate a deviation (difference) DT between the lock-up correction opening degree ILV and the load correction opening degree IAV which is set in the load correction processing, and then it is judged in S665 whether the deviation DT is larger than zero. If the deviation DT is judged not to be larger than zero, the load correction opening degree IAV is set as an actual control opening degree IV for actually controlling the opening and closing operation of the ISCV 38 in S670, and then "0" is set to the increment-settled flag F4, thereafter ending the lock-up correction processing.

On the other hand, it is judged in S665 that the deviation DT is larger than zero, the program goes to S680 to executes a processing serving as the opening and closing means in which the lock-up correction opening degree is set as the actual control opening degree IV, and then the lock-up correction processing is ended.

When the actual control opening degree IV is set in S670 or S680 as described above, through a control processing (not shown), a driving signal (duty signal or step driving signal) corresponding to the actual control opening degree IV is output to the ISCV 38, thereby controlling the opening and closing operation of the ISCV 38.

If it is judged in S635 that no lock-up instruction is made, it is judged that the lock-up releasing instruction is made, and the program goes to S685. Thereafter, it is judged in S685 whether the increment-settled flag F4 is equal to "1". If it is judged to be "1", that is, if the lock-up correction opening degree ILV is set as the actual control opening degree IV in S680, an attenuation amount K for attenuating the actual control opening degree IV is set in S690.

Here, the attenuation amount K is used to reduce the actual control opening degree IV every time the lock-up correction processing is executed as described later, so that the actual control opening degree IV finally reaches the load correction opening degree IAV. This amount K is set in accordance with a period from the time when the lock-up release instruction is made until the time when the lock-up clutch 64 is perfectly opened. For example, the lock-up correction processing (air suction amount correction processing) is executed every 4 ms, and if 500 ms is required for the lock-up clutch 64 to be perfectly opened, K is set as follows K=DT/(500/4).

Figure 9:
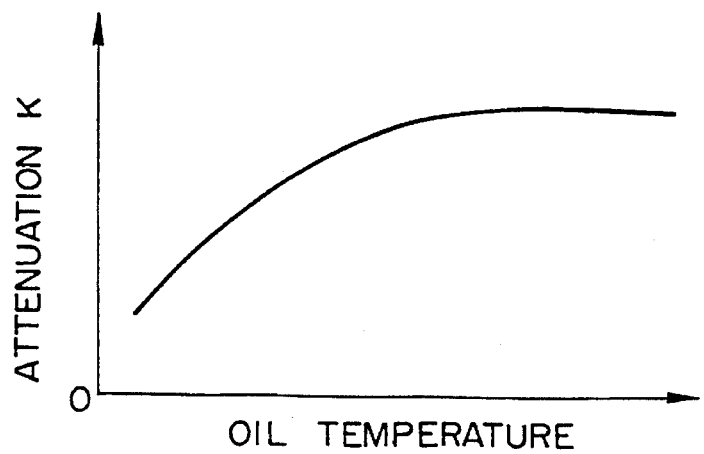
FIG. 9 is a diagram showing a data map for setting an attenuation amount in accordance with oil temperature.

The time until the lock-up clutch 64 is released becomes longer as the oil temperature of the automatic transmission 56 is lower, so that the data map shown in FIG. 9 may be beforehand stored in the ROM to set the attenuation amount K in accordance with the oil temperature. In this case, as the oil temperature is lower, the attenuation amount K is set to a smaller value, and thus a time in which the actual control opening degree IV is reduced from the lock-up correction opening degree ILV to the load correction opening degree IAV is set to be long. Further, the attenuation amount K may be set in accordance with the engine cooling water temperature in place of the oil temperature.

After the attenuation amount K is set as described above, the attenuation amount K is subtracted from the deviation DT in S695, and it is judged in S700 whether the deviation DT is less than zero. If the deviation DT is judged not to be less than zero, in S705, a value obtained by adding the deviation DT to the load correction opening degree IAV which is set in the load correction processing is set as the actual control opening degree IV, and then the lock-up correction processing is ended.

If the deviation DT is judged to be less than zero in S700, the program goes to S710 to set "0" to an increment-settled flag F4, and then the lock-up correction processing is ended.

On the other hand, if the increment-settled flag F4 is judged not to be "1" in S685, the program goes to S715 to set the load correction opening degree IAV as the actual control opening degree IV, and then the lock-up correction processing is ended.

That is, in the lock-up correction processing, when the lock-up instruction is output by the lock-up control processing, the lock-up correction opening degree ILV is first set as a control amount of the ISCV 38 (S635 to S655). If the set value is smaller than the load correction opening degree IAV which is set in the load correction processing, the load correction opening degree IAV is set as the actual control opening degree IV (S665: NO, S670). On the other hand, if the lock-up correction opening degree ILV is larger than the load correction opening degree, the lock-up correction opening degree ILV is set as the actual control opening degree IV (S665: YES, S680).

When the lock-up releasing instruction is output in the lock-up control processing in a state where the lock-up correction opening ILV is set as the actual control opening degree IV (S685: YES), the attenuation amount K is subtracted from the deviation DT between the lock-up correction opening degree ILV and the negative correction opening degree IAV to reduce the actual control opening degree IV every time the lock-up correction processing is executed (S690 to S705). If the deviation DT becomes negative, "0" is set to the increment-settled flag F4 (S700: YES, S710) so that the load correction opening degree IAV is afterwards set as the actual control opening degree IV (S715).

Next, the operation of this embodiment thus constructed will be described with reference to the time chart of FIG. 10.

Figure 10A:
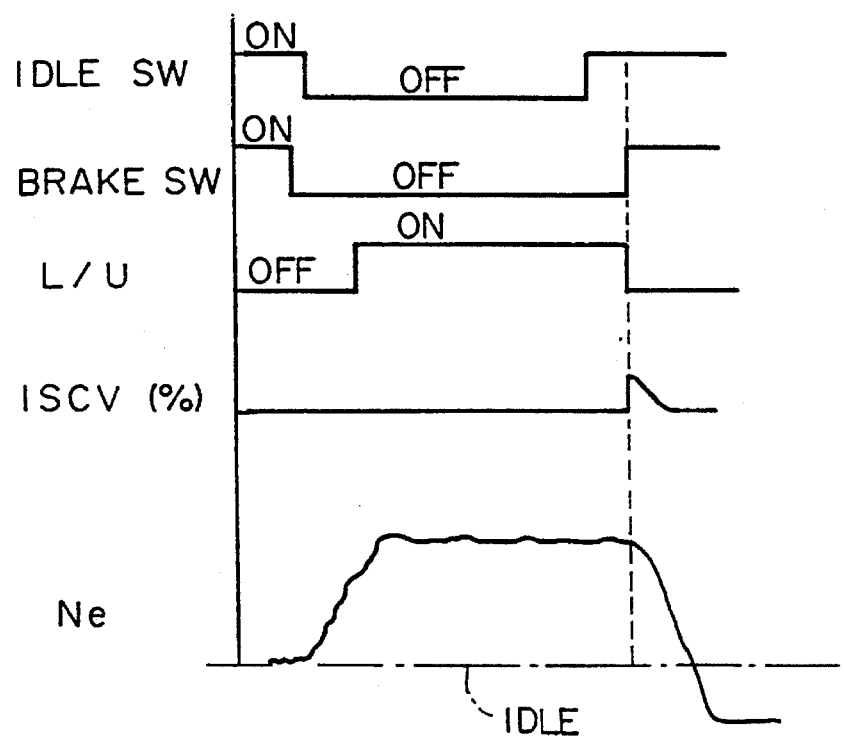
FIGS. 10A and 10B are time charts for an operation of the first embodiment.
Figure 10B:
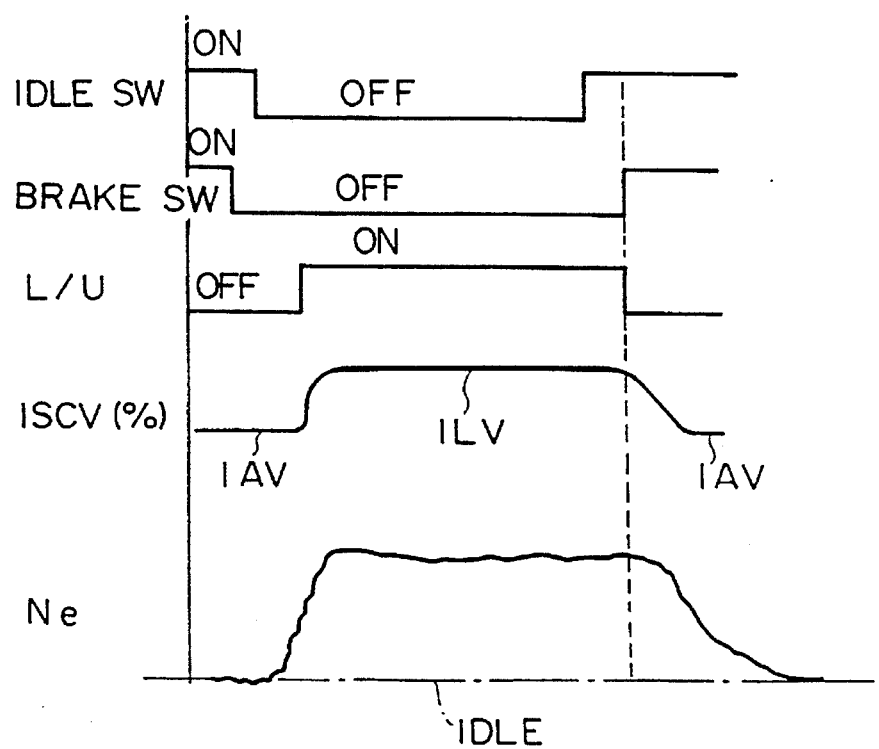

First, when a driver steps on an acceleration pedal and thus he does not step on a braking pedal as shown in FIG. 10B, both of the idle switch in the throttle sensor 24 and the brake switch 66 are off. In this case, the torque converter of the automatic transmission 56 is locked up in accordance with the vehicle speed V and the throttle opening degree at that time in the lock-up control processing. In FIGS. 10A and 10B, L/U:On represents a lock-up instruction, and L/U:OFF represents a lock-up releasing instruction.

In this case, the lock-up correction opening degree ILV is set in accordance with the vehicle speed V and the engine rotating number Ne in the lock-up correction processing of the air suction amount correcting processing. If the lock-up correction opening degree ILV is larger than the load correction opening degree IAV which is set in the load correction processing of the air suction amount correction processing, the ISCV 38 is controlled to be set to the lock-up correction opening degree ILV. That is, suction air into the internal combustion engine 2 is increased.

Thereafter, when the driver fully closes the acceleration pedal, the idle switch is switched off. If the vehicle speed V is above the lock-up releasing vehicle speed data VM2 shown in FIG. 4, the lock-up state is continued. That is, this continuous state corresponds to the coasting drive state. Thereafter, when the driver steps on the brake pedal, the brake switch 66 is switched on, and the lock-up releasing instruction is output to the lock-up solenoid 62 by the lock-up control processing (S130). Further, the opening degree of the ISCV 38 is gradually reduced to the load correction opening degree IAV by the lock-up correction processing (S690 to S710).

At this time, if the brake pedal is stepped on in a state where the torque converter of the automatic transmission 65 is locked up and the engine rotating number Ne is below the predetermined value, that is, the fuel cut is not carried out, the output power of the internal combustion engine 2 is beforehand increased in accordance with the increase of the air suction amount before the lock-up release is started.

Accordingly, even when there is a response delay from the step-on of the brake pedal until the release of the lock-up clutch 64, it can be prevented that the engine rotating number Ne is reduced to less than the idle rotating number and thus the engine stall occurs.

Further, even when the engine rotating number Ne is above the predetermined value and the fuel cut is carried out in the state where the torque converter of the automatic transmission 56 is locked up, the ISCV 38 is opened by the amount corresponding to the lock-up correction opening degree ILV, and thus the air suction amount of the internal combustion engine 2 has been already increased at the time when the lock-up release is started in response to the step-on of the brake pedal. Therefore, when the engine rotating number Ne is reduced in accordance with the step-on of the brake pedal and thus the fuel cut is released, the output power of the internal combustion engine 2 is simultaneously increased to more than the output power at the idling time.

Accordingly, even when there is a response delay from the quick step-on operation of the brake pedal until the release of the lock-up clutch 64, the occurrence of the engine stall can be prevented. In addition, since the lock-up state can be continued without inducing the engine stall until the brake pedal is stepped on as described above, the fuel cut period can be kept longer, and thus the fuel consumption can be improved.

It may be considered that the opening degree of the ISCV 38 is increased as shown in FIG. 10A. In this case, the engine rotating number Ne may be reduced to less than the idle rotating number and thus the engine stall may occur because there is a response delay from the time when the suction air amount is increased till the time when the fuel amount in accordance with the increment of the suction air is supplied. On the other hand, in this embodiment, the air suction amount is increased before the brake pedal is stepped on, and thus the occurrence of the engine stall can be perfectly prevented.

Furthermore, in this embodiment, when the brake pedal is stepped on, the opening degree of the ISCV 38 is gradually reduced from the lock-up correction opening degree ILV to the load correction opening degree IAV. Accordingly, as described above, the engine stall at the lock-up release time can be prevented, and deterioration of an engine brake effect due to increase of the output power of the internal combustion engine 2 can be suppressed to the minimum value.

In addition, in this embodiment, when the lock-up correction opening degree ILV is smaller than the control opening degree of the ISCV 38 which is set in accordance with a load applied to the internal combustion engine 2, that is, the load correction opening degree IAV, the opening and closing operation of the ISCV 38 is controlled with the value of the load correction opening degree IAV. The reason for this is as follows. When the load correction opening degree IAV is larger than the lock-up correction opening degree ILV, the engine stall at the lock-up release time can be prevented if the ISCV 38 is opened by the load correction opening degree IAV. That is, both of the opening and closing control of the ISCV 38 in accordance with the load of the internal combustion engine 2 and the opening and closing control of the ISCV 38 at the lock-up release time are compatible with each other.

Still furthermore, in this embodiment, the lock-up correction processing is executed in the air suction amount correction processing only when the judgment processing shown in FIG. 6 judges the friction coefficient of a road surface to be low under cold atmosphere or rainy weather. When the friction coefficient of the road surface is low, the wheels are liable to be locked due to the step-on of the brake pedal, and the engine stall is more liable to occur due to the operational response delay of the lock-up clutch 64. Therefore, by executing the lock-up correction processing in such a case, the adverse effect of the opening of the ISCV 38 on the fuel consumption and emission can be suppressed to the minimum.

In this embodiment as described above, the air suction amount is increased by controlling the opening and closing operation of the ISCV 38, whereby the engine stall at the lock-up release time is prevented. However, the air suction amount may be increased by controlling the opening and closing operation of the purge control valve 46 or the EGR valve 50. In this case, the air is directly introduced into the surge tank 10 as shown in FIG. 2, so that the ECU 52 cannot detect the air suction amount on the basis of the signal from the air flow meter 20. However, the fuel injection amount is increased, and thus the output power of the internal combustion engine 2 by the correction control of a fuel injection time which is executed on the basis of the detection signal from the air-fuel ratio sensor 28. Therefore, in this case, the engine stall at the lock-up release time can be also prevented.

When the vehicle is equipped with a so-called throttle control mechanism of controlling the opening and closing operation of the throttle valve 8 separately from the acceleration pedal, the air suction amount may be increased by controlling the driving of the mechanism.

On the other hand, in the above embodiment, the air suction amount is increased by opening the ISCV 38 simultaneously with the lock-up instruction. However, the air suction amount may be increased at least before the lock-up release instruction is made. That is, the air suction amount may be increased after a predetermined time elapses from the output of the lock-up instruction.

Further, in the above embodiment, the basic opening degree IIV which is set in accordance with the engine cooling water temperature is corrected in accordance with the load applied to the internal combustion engine 2 (the actuation of the refrigerant compressing compressor of the air conditioner, the power steering and the respective electrical loads) in the load correction processing of the air suction amount correction processing, thereby setting the load correction opening degree IAV of the ISCV 38. The load correction opening degree IAV may be further corrected in accordance with the engine rotating number Ne, and the corrected load correction opening degree IAV and the lock-up correction opening degree ILV may be compared.

In the above embodiment, the air suction amount is beforehand increased before the lock-up release instruction is made. However, the air-fuel mixture may be supplied into the internal combustion engine 2 simultaneously with the lock-up release instruction. Accordingly, a control system for opening the purge control valve 46 simultaneously with the output of the lock-up instruction to the automatic transmission 56 to supply the internal combustion engine 2 with the fuel vapor gas which is adsorbed and held in the charcoal canister 40 will be described as a second embodiment.

Figure 11:
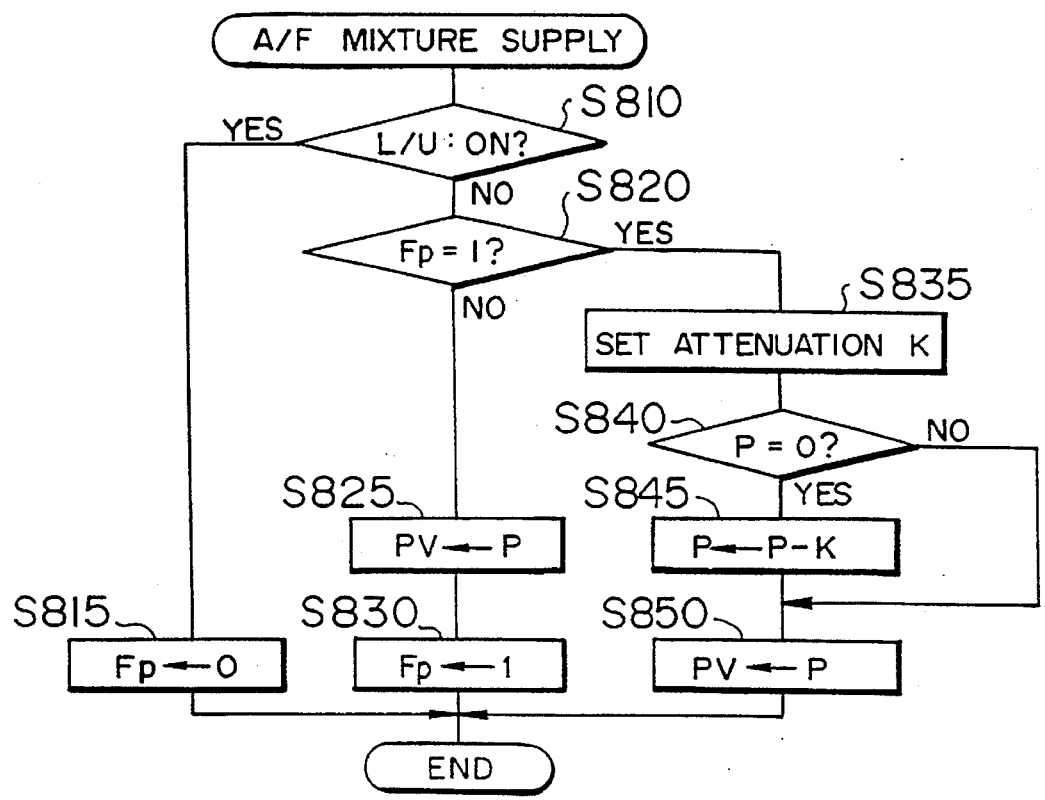
FIG. 11 is a flowchart for an air-fuel mixture supply processing in a second embodiment.

The control system of the second embodiment has the same construction as the first embodiment except that in place of the air suction amount correction processing, an air-fuel (A/F) mixture supply processing serving as air-fuel mixture increasing means shown in FIG. 11 is executed in the ECU 52. Like the air suction amount correction processing of the first embodiment, the air-fuel mixture supply processing is executed every predetermined time (for example, 4 ms) in parallel to the lock-up control processing. Further, like the lock-up correction processing of the first embodiment, it is executed only when "1" is set to the low μ road flag Fμ by the judgment processing shown in FIG. 6.

The air-fuel (A/F) mixture supply processing will be described hereunder.

When execution of the air-fuel mixture supply processing is started, in S810, it is first judged by the lock-up control processing whether the lock-up instruction is currently made. If the lock-up instruction is judged to be made, the program goes to S815 to set "0" to the increment-settled flag Fp, and then the air-fuel mixture supply processing.

On the other hand, if the lock-up instruction is judged not to be made in S810, the lock-up release instruction is judged to be made, and thus the program goes to S820. In S820, it is judged whether the increment-settled flag Fp is equal to "1". If it is not "1", a demanded opening degree P is read in from the ROM in S825, and the read value is set as the actual control opening degree PV of the purge control valve 46. Subsequently, "1" is set to the increment-settled flag Fp in S830, and then the air-fuel mixture supply processing is ended. Like the demanded opening degree B in the lock-up correction processing of the first embodiment, it is beforehand stored in the ROM in accordance with the vehicle speed V and the engine rotating number Ne, and it is set to a larger value as the vehicle speed and the rotating number are lower. That is, the engine stall at the lock-up release time is more liable to occur as the vehicle speed V is lower and the engine rotating number Ne is lower, and thus the opening degree of the purge control valve 46 is set to be larger. If the increment-settled flag Fp is judged to be "1" in S820, the program goes to S835 to set the attenuation amount K for attenuating the actual control opening degree PV. With the attenuation amount K, the actual control opening degree PV is reduced every time the air-fuel mixture supply processing is carried out, then finally reaches zero. Like the attenuation amount K in the lock-up correction processing of the first embodiment, this attenuation amount K is set in accordance with the time period from the output of the lock-up release instruction till the perfect opening of the lock-up clutch 64. The attenuation amount K may be set in accordance with the oil temperature of the automatic transmission 56 and the engine cooling water temperature like the first embodiment.

As described above, after the attenuation amount K is set, it is judged in S840 whether the demanded opening degree P is equal to zero. If it is judged not to be zero, the attenuation amount K is calculated on the basis of the demanded opening degree P in subsequent S845. Thereafter, in S850, the demanded opening degree P is set as the actual control opening degree PV, and then the air-fuel mixture supply processing is ended.

If the demanded opening degree is judged to be zero in S840, the program directly goes to S850 to set the value (zero) as the actual control opening degree PV, and then the air-fuel mixture supply processing is ended.

When the actual control opening degree PV is set in S850 as described above, through a control processing (not shown), a driving signal having the duty ratio corresponding to the actual control opening degree PV is output to the purge control valve 46 to control the opening and closing operation of the purge control valve 46.

That is, in the air-fuel mixture supply processing, when the lock-up release instruction is output in the lock-up control processing, the demanded opening degree P is first set as the actual control opening degree PV of the purge control valve 46 (S825), and then the actual control opening degree PV is reduced by the attenuation amount K every time the air-fuel mixture supply processing is executed, thereby finally setting the actual control opening degree PV to zero (S840 to S850).

Figure 12:
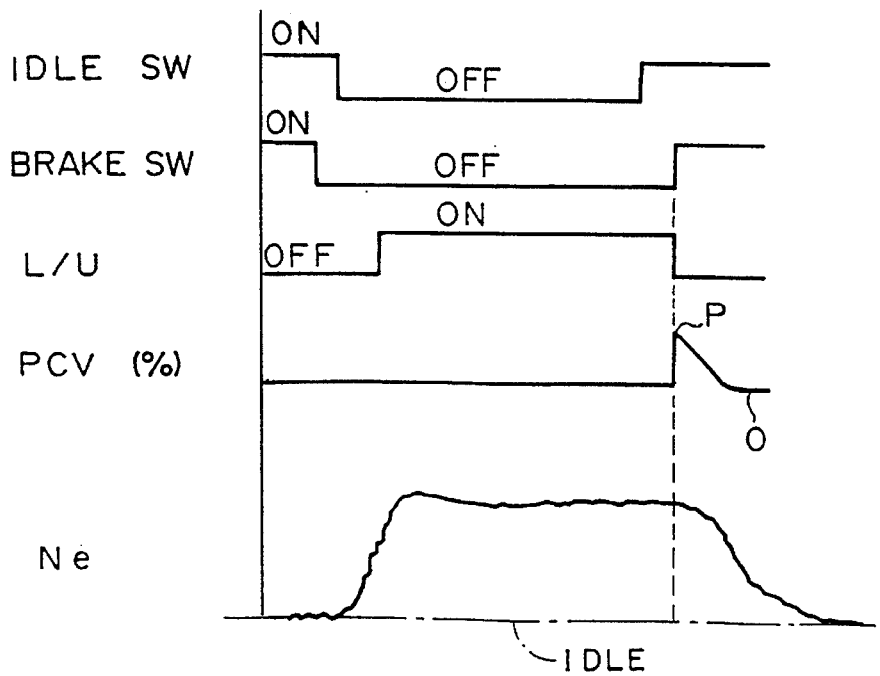
FIG. 12 is a time chart for an operation of the second embodiment.

Next, the operation of the control system of this embodiment will be described with reference to the time chart of FIG. 12.

First, when the driver steps on the acceleration pedal and thus he does not step on the brake pedal, both of the idle switch in the throttle sensor 24 and the brake switch 66 are off. By the lock-up control processing, the torque converter of the automatic transmission 56 is locked up in accordance with the vehicle speed V and the throttle opening degree at that time.

When the driver steps on the brake pedal in this state, the brake switch 66 is switched on, and the lock-up release instruction is output to the lock-up solenoid 62 by the lock-up control processing (S130). At the same time, the purge control valve 46 is opened to the demanded opening degree P by the air-fuel mixture supply processing (S825), whereby the fuel vapor gas which is adsorbed and held in the charcoal canister 40 is supplied into the internal combustion engine 2. Thereafter, the opening degree of the purge control valve 46 is gradually reduced to zero.

Therefore, according to the second embodiment, even when there is a response delay from the step-on of the brake pedal till the release of the lock-up clutch 64, the output power of the internal combustion engine 2 is increased by the fuel vapor gas (air-fuel mixture) supplied from the purge control valve 46, so that the engine stall at the lock-up release time can be prevented. That is, in the second embodiment, since the internal combustion engine 2 is supplied with the air-fuel mixture (not mere air), the output power of the internal combustion engine 2 is increased even when the purge control valve 46 is designed to be opened simultaneously with the lock-up release instruction shown in FIG. 10A, and thus occurrence of the engine stall can be prevented.

Furthermore, in the second embodiment, the opening degree of the purge control valve 46 is also gradually reduced from the demanded opening degree P, so that the engine stall at the lock-up release time can be prevented and deterioration of the engine brake effect due to increase of the output power of the internal combustion engine 2 can be suppressed to the minimum.

In addition, in the second embodiment, the air-fuel mixture supply processing is executed only when the friction coefficient of the road surface is judged to be lowered due to the cold atmosphere or rainy weather by the judgment processing shown in FIG. 6. Therefore, the adverse effect on the emission by the opening of the purge control valve 46 can be suppressed to the minimum.

In the second embodiment, the engine stall at the lock-up release time is prevented by controlling the opening and closing operation of the purge control valve 46. The residual fuel in the exhaust gas may be recirculated into the surge tank 10 by controlling the opening and closing operation of the EGR valve 50, thereby increasing the air-fuel mixture.

In the first and second embodiments as described above, a preset fixed value or a value which is variable in accordance with the oil temperature of the automatic transmission or the engine cooling water temperature is used as the attenuation amount K when the ISCV 38 or the purge control valve 46 is closed. The attenuation amount K may be set in accordance with the throttle opening degree before the brake pedal is stepped on.

In view of the foregoing, a control system in which the attenuation amount K when the ISCV 38 or the purge control valve 46 is closed is set in accordance with the throttle opening degree will be described as a third embodiment.

Figure 13:
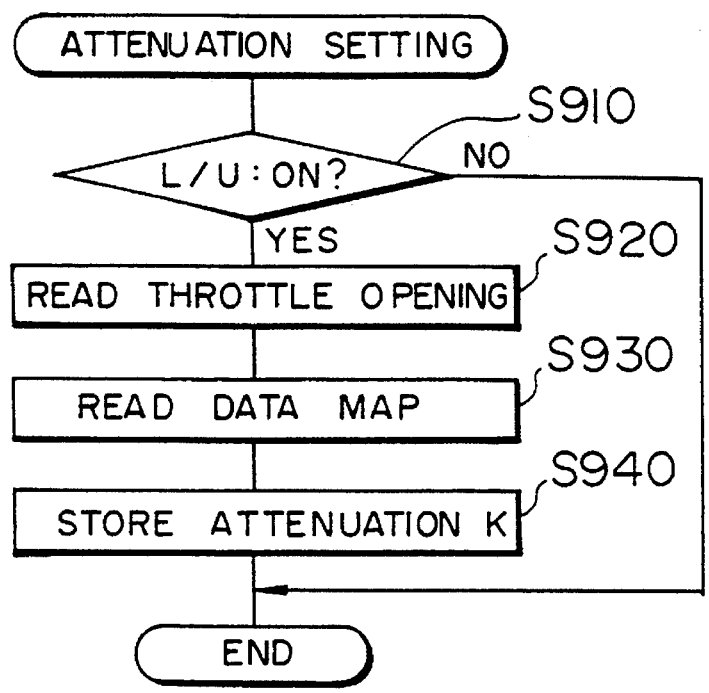
FIG. 13 is a flowchart for an attenuation amount setting processing in a third embodiment.

The third embodiment has the same construction as the first and second embodiments, and the processing to be executed in ECU 52 is identical to that of each embodiment. However, this embodiment is different from the first and second embodiments in that an attenuation amount setting processing shown in FIG. 13 is additionally executed in the ECU 52.

The attenuation amount setting processing is executed at a cycle (for example, every 500 ms) which is larger than an executing cycle of the air suction amount correction processing of the first embodiment or the air-fuel mixture supply processing of the second embodiment and in parallel to the latter two processing.

In the attenuation amount setting processing, it is judged in S910 by the lock-up control processing whether the lock-up instruction is made. If the lock-up instruction is judged not to be made, the attenuation amount setting processing is ended. On the other hand, if the lock-up instruction is judged to be made, the program goes to S920.

Figure 14:
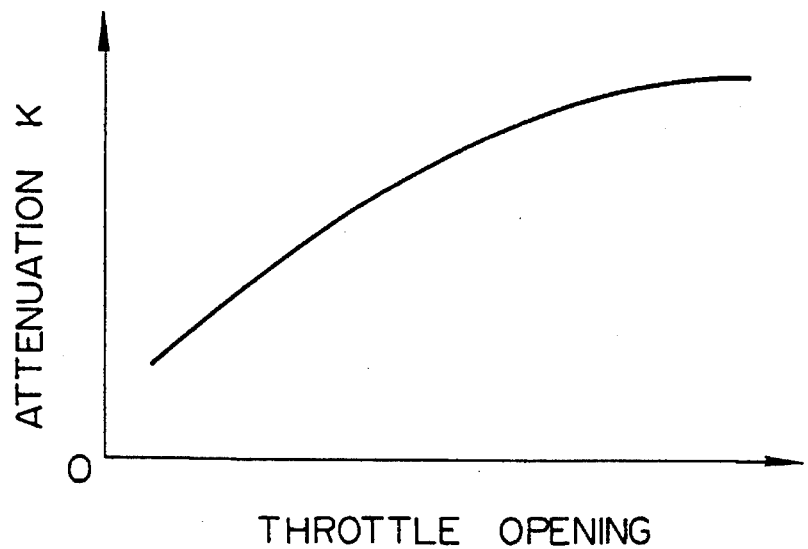
FIG. 14 is a diagram showing a data map for setting an attenuation amount in accordance with a throttle opening degree.

In S920, the current throttle opening degree is read in, and in subsequent S930 the attenuation amount K corresponding to the current throttle opening degree is read in from the data map stored in the ROM according to the graph shown in FIG. 14. In the data map, the attenuation amount K is beforehand set in correspondence with the throttle opening degree. The data map is set so that the attenuation amount K increases as the throttle opening degree increases. The reason for this is as follows. When the throttle opening degree is large, the engine rotating number Ne is high, so that the engine stall may be hard to occur even when the ISCV 38 or the purge control valve 46 is quickly closed by setting the attenuation amount K to a large value.

Thereafter, in S940, the read-in attenuation amount K is stored in the RAM, and then the attenuation amount setting processing is ended.

In the third embodiment, the attenuation amount K which is stored in the RAM in S940 is read out in S690 of the lock-up correction processing (FIG. 8) or S835 of the air-fuel mixture supply processing (FIG. 11).

That is, in the third embodiment, the attenuation amount K corresponding to the current throttle opening degree is renewed every predetermined time (for example, every 500 ms) at all times by executing the attenuation amount setting processing, so that the attenuation amount K can be set in accordance with the throttle opening degree just before the lock-up release is started upon step-on of the brake pedal.

As shown in FIG. 14, the attenuation amount K is set to a larger value when the throttle opening degree and the engine rotating number Ne are regarded as being larger and higher, and further it is set to a smaller value when the throttle opening degree and the engine rotating number Ne are regarded as being smaller and lower.

Accordingly, when the engine rotating number Ne is high and the engine stall is hard to occur at the lock-up release time, the ISCV 38 or the purge control valve 46 is quickly closed to improve the engine brake effect. Conversely, when the engine rotating number Ne is low and the engine stall is liable to occur, the ISCV 38 or the purge control valve 46 is gradually closed to surely prevent the engine stall.

In the third embodiment, the attenuation amount K corresponding to the current throttle opening degree is directly read out from the data map. In addition, a correction coefficient corresponding to the throttle opening degree may be beforehand stored in the ROM. In this case, the attenuation amount K which is set in accordance with the oil temperature of the automatic transmission 56 or the engine cooling water temperature is multiplied by the correction coefficient to calculate an actually used attenuation amount. Therefore, the attenuation amount can be calculated with higher precision.

In place of the setting of the attenuation amount or the correction coefficient in accordance with the throttle opening degree as described above, the attenuation amount or the correction coefficient may be set in accordance with the engine rotating number Ne at the time when the brake switch 66 is switched on. In this case, the optimum attenuation amount can be set with higher precision.

Figure 15:
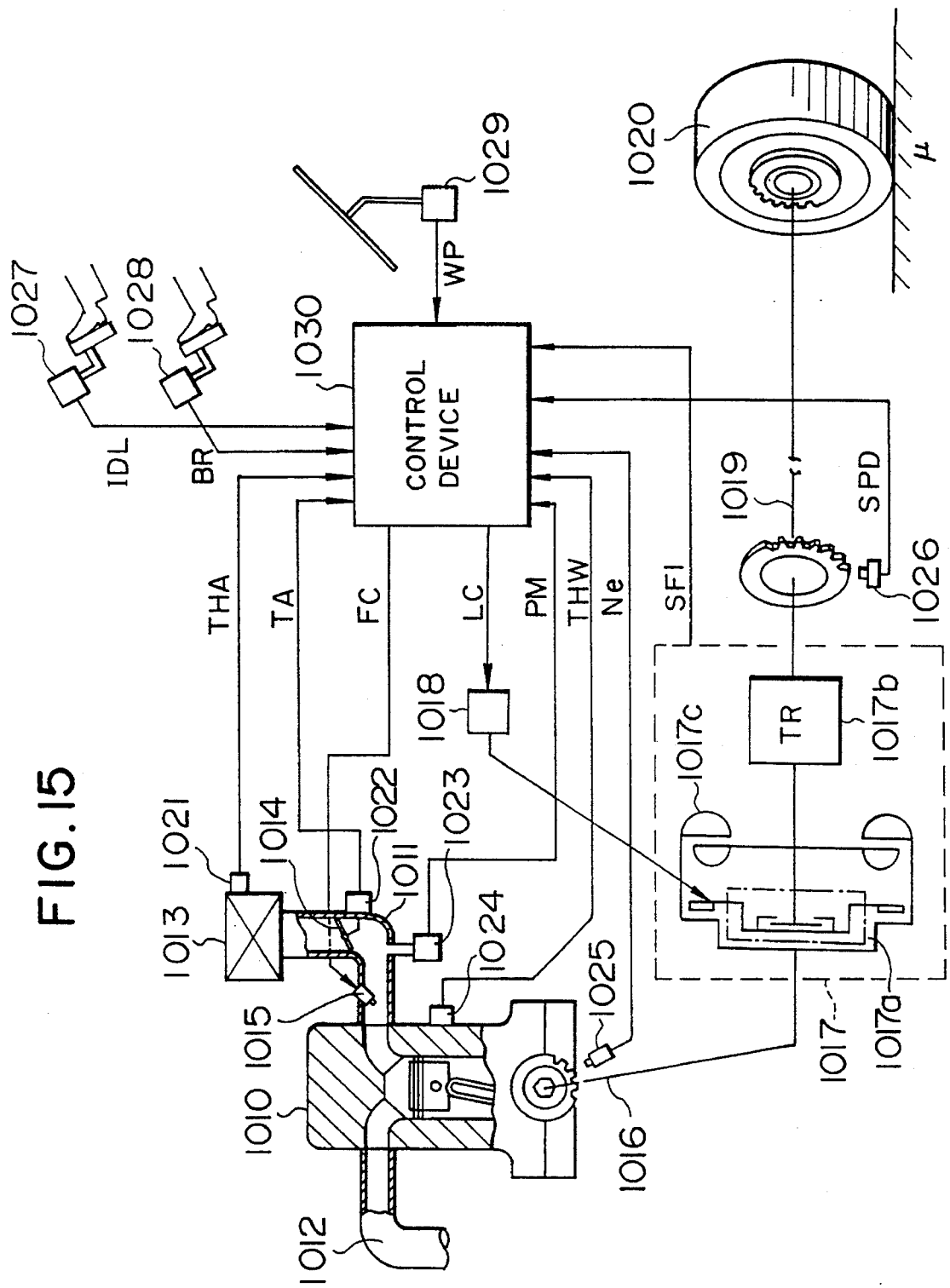
FIG. 15 is a block diagram showing a fourth embodiment of a vehicle control device of the present invention.

FIG. 15 shows another embodiment of the vehicle control system according to the second object of the present invention.

In this control system, various kinds of sensors and switches 1021 to 1029 are provided to an engine 1010 and its peripheral devices, and a control device 1030 executes an on/off control operation of the fuel cut and an on/off control operation of the lock-up mechanism on the basis of detection signals of these sensors and switching states of these switches.

First, the whole construction of the control system of the embodiment will be described with reference to FIG. 15.

The engine 1010 is provided with an air suction pipe 1011 and an exhaust pipe 1012. Air is sucked from an air cleaner 1013 through the air suction pipe 1011 into cylinders, and exhaust gas obtained after the combustion is performed in the cylinders is discharged through the exhaust pipe 12.

The air cleaner 1013 is provided with a suction temperature sensor 1021, and the temperature THA of the air sucked from the air cleaner 1013, that is, the temperature of the outside air is detected by the suction temperature sensor 1021.

The flow amount of the air sucked into the air suction pipe 1011 is controlled by a throttle valve 1014 which is interlocked with the acceleration pedal. The opening degree TA of the throttle valve 1014 is controlled by a throttle opening degree sensor 1022. The in-pipe pressure of the air suction pipe 1011, that is, the suction pressure PM is detected by a suction pressure sensor 1023 provided to a surge tank.

On the other hand, fuel is fed under pressure from a fuel tank (not shown), and injected from a fuel injection valve 1015 provided to the air suction pipe 1011 (intake manifold) to the inside of the engine 1010 (air suction valve of each cycle). The fuel supply amount is controlled to a proper amount on the basis of a driving signal FC of the fuel injection valve 1015 which is output from the control device 30.

A water jacket (not shown) is provided around the body of the engine 1010. The water temperature THW of cooling water filled in the water jacket is detected by the water temperature sensor 1024. A thermistor is usually used as the water temperature sensor 1024, and variation of the water temperature THW is detected as variation of the resistance value of the thermistor.

The rotating number Ne of the engine 1010 is detected by a rotating number sensor (crank angle sensor) 1025 which is disposed in the neighborhood of the output shaft (crank shaft) 1016 of the engine 1010. The rotating number sensor 1025 is provided so as to face a ring gear which rotates in synchronism with the output shaft 1016 of the engine 1010, and outputs pulse signals whose pulse number corresponds to that of the gear teeth of the ring gear every one rotation of the engine 1010.

Further, the output shaft 1016 of the engine 1010 is linked to an automatic transmission 1017 having a lock-up mechanism 1017a.

The automatic transmission 1017 mainly comprises a lock-up mechanism (lock-up clutch) 1017a, a transmission (TR) portion 1017b and a torque converter 1017c. The joint/release of the lock-up mechanism 1017a, that is, the on/off operation of the lock-up mechanism 1017a is controlled through a lock-up mechanism controlling solenoid valve 1018. The lock-up mechanism controlling solenoid valve 1018 is controlled by a lock-up control signal LC which is output from the control device 1030. Therefore, the on/off control operation of the lock-up mechanism 1017a is finally controlled by the lock-up control signal LC which is output from the control device 1030.

Shift information SFI indicating a shift state of the automatic transmission is assumed to be monitored and output on real time from the automatic transmission 1017 to the control device 30. The shift information SFI may be control information of the automatic transmission 1017 which is output from a transmission control device (not shown). In the control system of this embodiment, the shift information SFI is used to notify the following information to the control device 1030:

* information indicating that the shift change is not currently being carried out; and
* information indicating that the current gear is not the first or reverse gear.

The output shaft 1019 of the automatic transmission 1017 is linked to tires 1020 of the vehicle. A vehicle speed sensor 1026 is provided adjacent to the output shaft 1019, and the vehicle speed SPD of the vehicle is detected through the vehicle speed sensor 1026. Like the rotating number sensor 1025 as described above, the vehicle speed sensor 1026 is disposed so as to face the ring gear 1026 which rotates in synchronism with the output shaft 1019 of the transmission 1017, and it outputs pulse signals whose pulse number corresponds to that of the gear teeth of the ring gear 1019 at every rotation of the output shaft 1019.

The control system of this embodiment is further provided with an idle switch 1027 which is switched on when an accelerator is fully closed by releasing an acceleration pedal of the vehicle or the like, that is, when the vehicle is in an idle state, a brake switch 1028 which is switched on when a brake pedal of the vehicle is stepped on, and a wiper switch 1029 which is switched on by driving a wiper of the vehicle, and an idle signal IDL, a brake signal BR and a wiper signal WP which indicate the respective switching states of the above switches respectively are input to the control device 1030.

Figure 16:
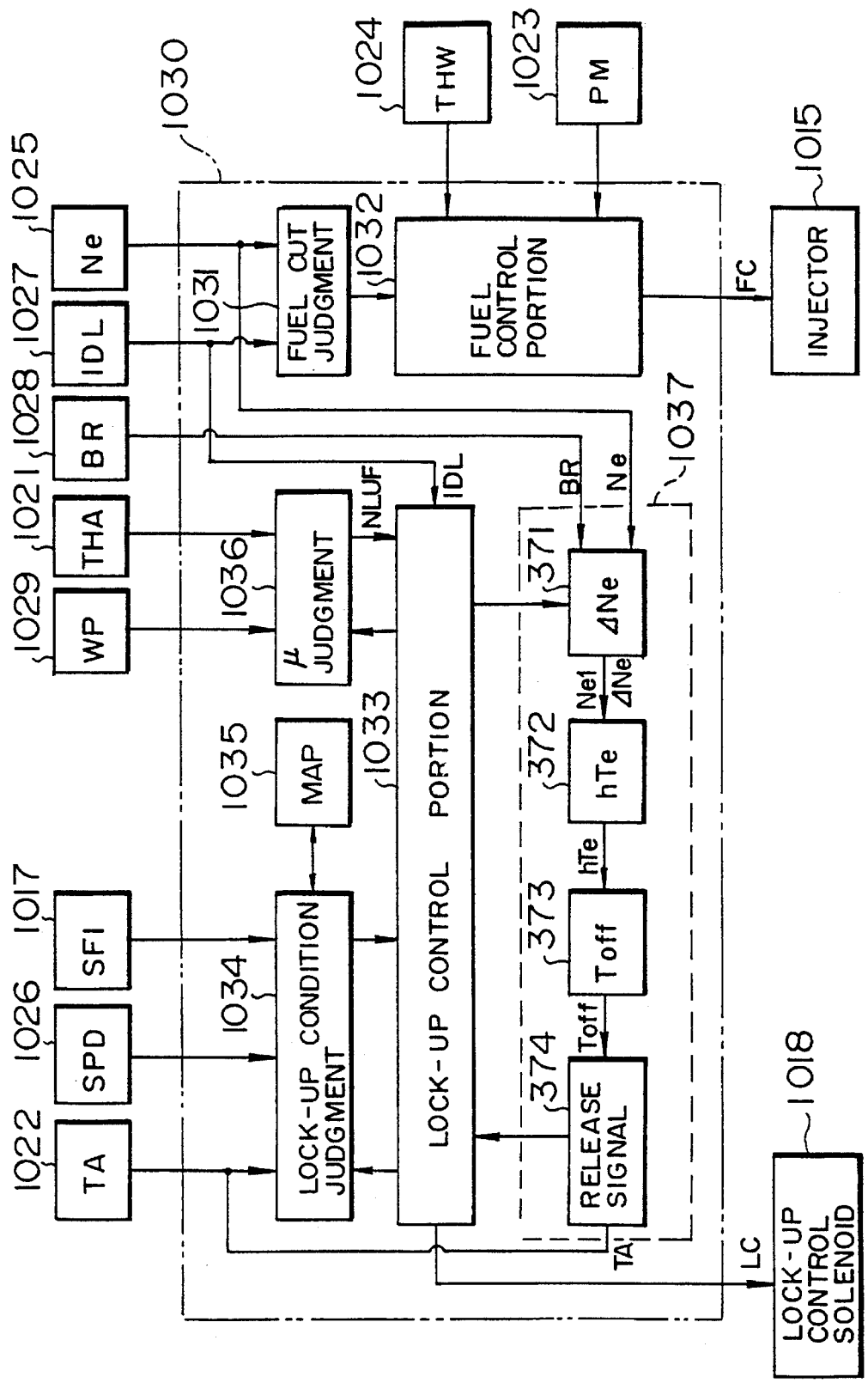
FIG. 16 is a block diagram showing the detailed construction of the control system shown in FIG. 15.

FIG. 16 shows the construction of the control device 1030, and FIGS. 17 to 24 show control procedures and control modes of the fuel cut on/off control operation and the lock-up mechanism on/off control operation which are executed by the control device 1030. The function and the operation of the control system for the vehicle of this embodiment will be described hereunder with reference to FIGS. 16 to 24.

The control device 1030 comprises a microcomputer, for example, and in this embodiment, the procedure for functionally implementing the construction shown in FIG. 16 is beforehand stored as an executing program in the control device 1030.

In the control device 1030, a fuel cut judgment portion 1031 judges whether "fuel cut" should be performed or not on the basis of the idle signal IDL indicating the state of the idle switch 1027 and the engine rotating number signal Ne output from the rotting number sensor 11025.

Figure 17:
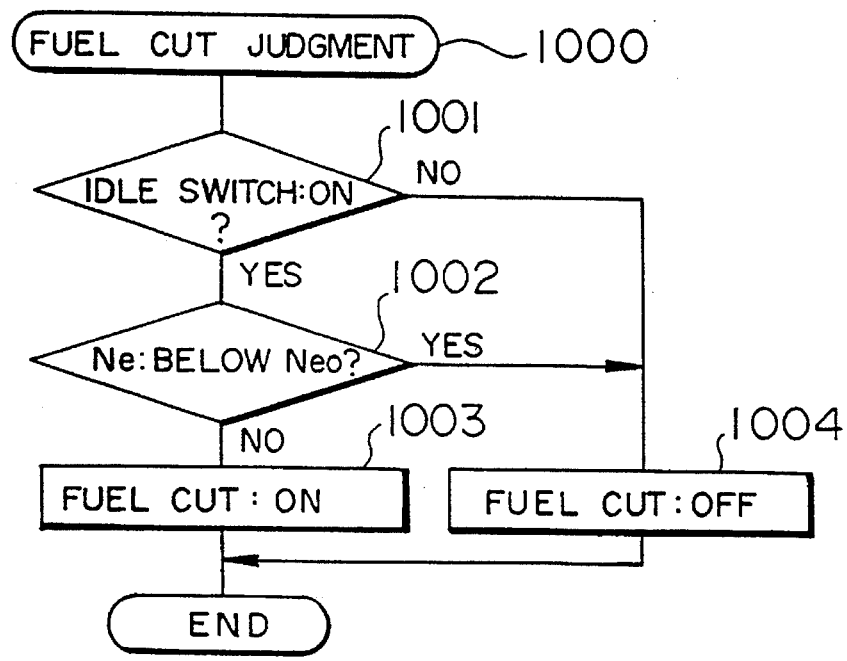
FIG. 17 is a flowchart for a processing procedure of a fuel cut judgment processing by the device of the fourth embodiment.

In the fuel cut judgment portion 1031, whether the "fuel cut" should be performed or not is judged through a fuel cut judgment processing routine 1000 shown in FIG. 17 which is executed every 4 ms (milliseconds).

That is, in the fuel cut judgment processing routine 1000 shown in FIG. 17, the "fuel cut" is judged to be executed if the engine rotating number Ne exceeds a fuel cut returning rotating number Neo (step 1002) under a condition that the idle switch 1027 is switched on, that is, the acceleration pedal is not stepped on (step 1001). In this case, "fuel cut: on" is instructed to a fuel control portion 1032 (step 1003).

If the idle switch 1027 is judged not to be on, or if the idle switch 1027 is judged to be on, but the engine rotating number Ne is below the fuel cut returning rotating number Neo, no execution of the "fuel cut" is judged, and "fuel cut: off" is instructed to the fuel control portion 1032 (step 1004).

Figure 18:
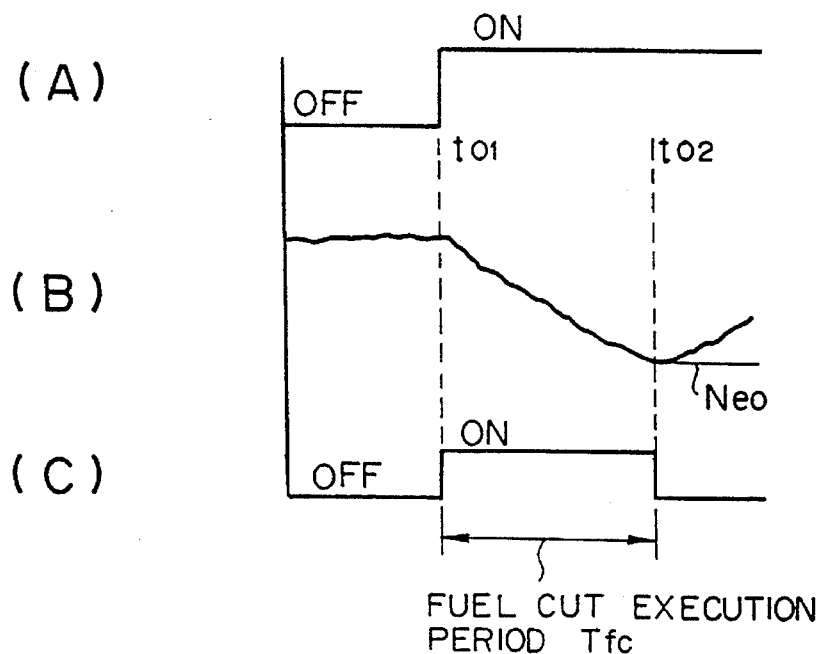
FIG. 18 is a timing chart for a fuel cut executing mode by the device of the fourth embodiment.

In the fuel control portion 32 of the control device 1030, the fuel cut is executed in a mode shown in FIG. 18 on the basis of the above judgment of the fuel cut judgment portion 1031.

FIG. 18 shows in (A) an on/off mode of the idle switch 1027, and FIG. 18 shows in (B) variation of the engine rotating number Ne. If the idle switch 1027 is switched on at a time t01 when the rotating number Ne exceeds the fuel cut returning rotating number Neo, in the fuel control portion 1032, the fuel cut is executed over a period (time) Tfc from the time t01 till the time t02 when the engine rotating number Ne reaches the fuel cut returning rotating number Neo. That is, during the fuel cut executing period Tfc, an instruction value "0" is output as a driving signal Fc for the fuel injection valve 1015 from the fuel control portion 1032. After the returning from the fuel cut, a well-known fuel supply amount control is executed on the basis of the output THW of the water temperature sensor 1024 and the output PM of the suction pressure sensor 1023 by the fuel control portion 1032.

On the other hand, in the control device 1030 shown in FIG. 16, the lock-up control portion 1033 serves to control the driving of the lock-up mechanism controlling solenoid valve 1018, that is, the on/off operation of the lock-up mechanism 1017a.

Figure 19:
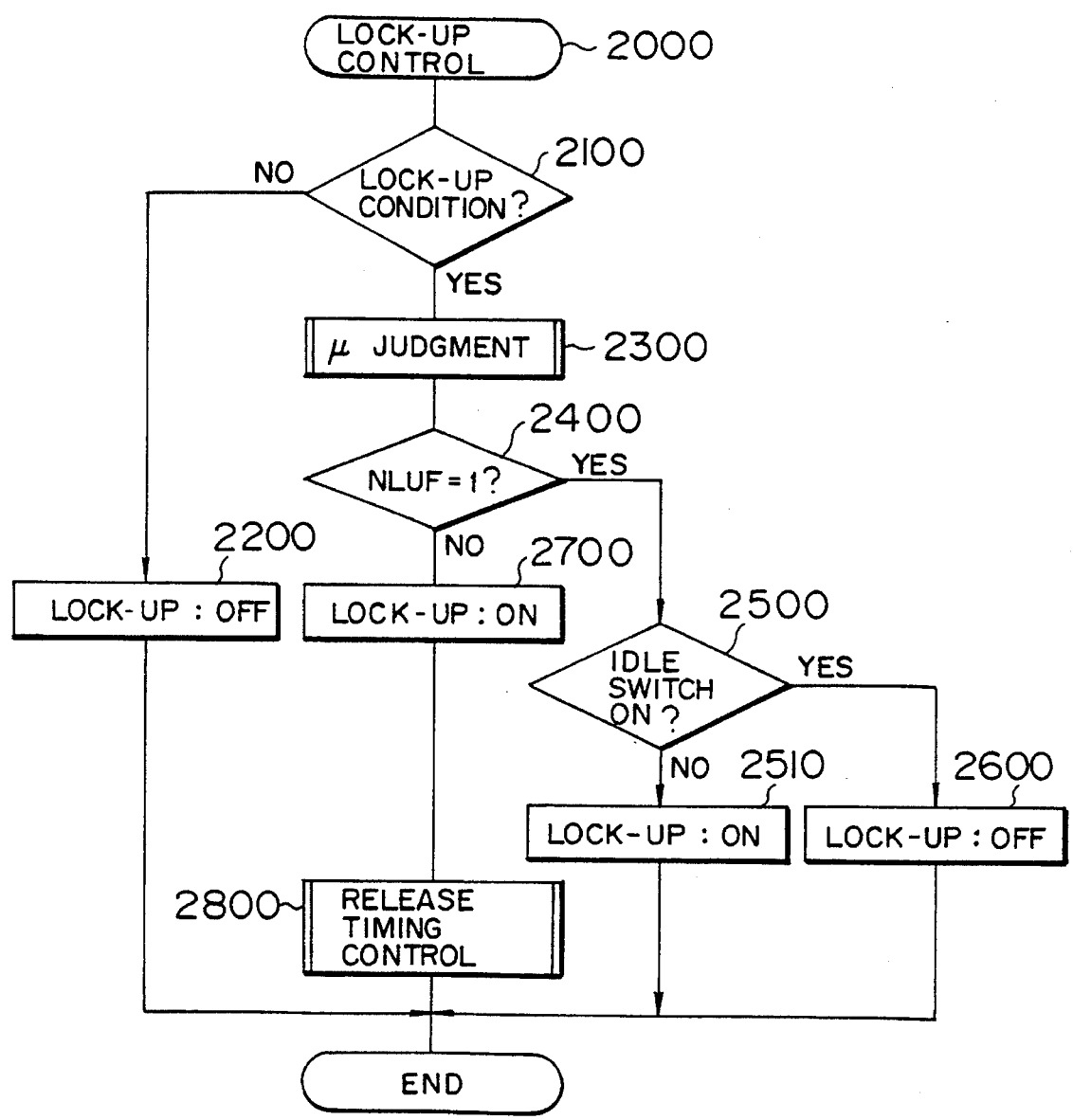
FIG. 19 is a flowchart for a control procedure of a lock-up control by the device of the fourth embodiment.

In the lock-up control portion 1033, the on/off control of the lock-up mechanism 1017a is executed through a lock-up control routine 2000 shown in FIG. 19 which is started every 4 ms (milliseconds), for example, That is, in the lock-up control routine 2000 shown in FIG. 19, the control portion 1033 first judges through the lock-up condition judgment portion 1034 whether the current driving state of the vehicle satisfies a lock-up condition, that is, a condition under which the lock-up mechanism 1017a should be switched on (step 2100).

The lock-up condition judgment portion 1034 checks on the basis of the shift information SFI whether the following conditions are satisfied:

(a) the shift change is not being performed currently; and (b) the current gear is not in the first or reverse position. Further, the lock-up condition judgment portion 1034 refers to the operation condition map 1035 of the lock-up mechanism, and checks whether the relationship between the vehicle speed information obtained from the vehicle sensor 1026 and the throttle opening degree information obtained from the throttle opening degree sensor 1022 satisfies the operation condition of the lock-up mechanism 1017a. If all these conditions are satisfied, the satisfaction of the lock-up condition is transmitted to the lock-up control portion 1033.

Figure 20:
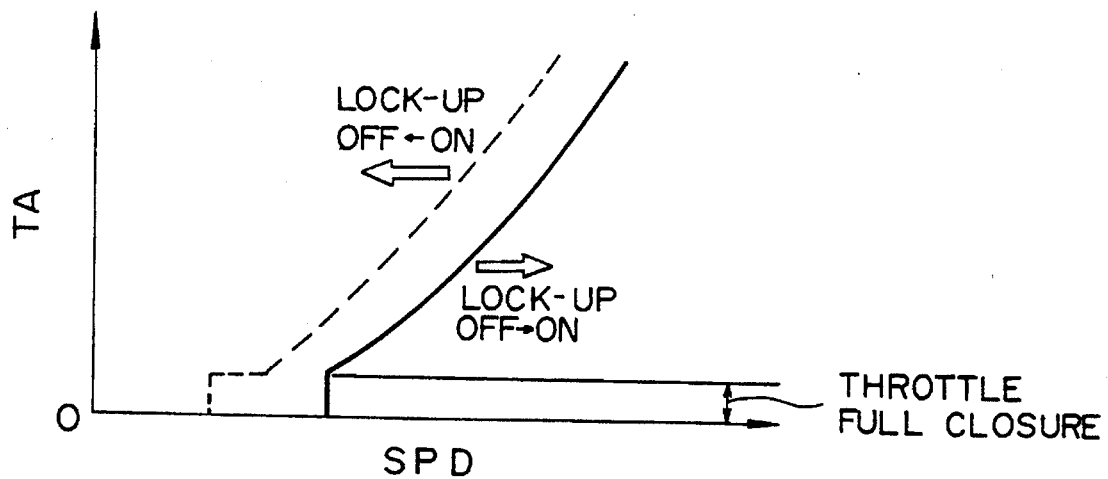
FIG. 20 is a graph showing an example of a lock-up operation condition map, which is used when the device of the fourth embodiment judges whether the lock-up condition is satisfied.

In the operation condition map 1035 are registered a relationship shown in FIG. 20 which is based on the vehicle speed information SPD and the throttle opening degree information TA. That is, in the operation condition map 1035, the following operations are executed on the basis of the vehicle speed information and the throttle opening information TA which are given from the judgment portion 1034 as described above:

(a) returning information indicating that the condition (c) as described above is satisfied if the relationship is in a "lock-up operation area" of the map; and (b) returning information indicating that the condition (c) is not satisfied if the relationship is in a "lock-up non-operation area" of the map.

A hysteresis is provided at the boundary between the "lock-up operation area" and the "lock-up non-operation area" to effectively avoid occurrence of a hunting, etc. when the shift between these areas is judged.

In the lock-up control routine 2000 shown in FIG. 19, the lock-up control portion 1033 receives the information on the satisfaction or unsatisfaction of the lock-up condition from the judgment portion 1034 as described above, and then if the received information indicates the unsatisfaction of the condition, the lock-up control portion 1033 controls the lock-up mechanism controlling solenoid 1018 through the lock-up control signal LC so that the lock-up mechanism 1017a is set to an off (joint release) state (step 2200), thereafter moving from the routine 2000.

On the other hand, if the received information indicates the satisfaction of the lock-up condition, through the road surface μ judgment portion 1036, the lock-up control portion 1033 judges the road surface on which the vehicle is currently running (step 2300).

Figure 21:
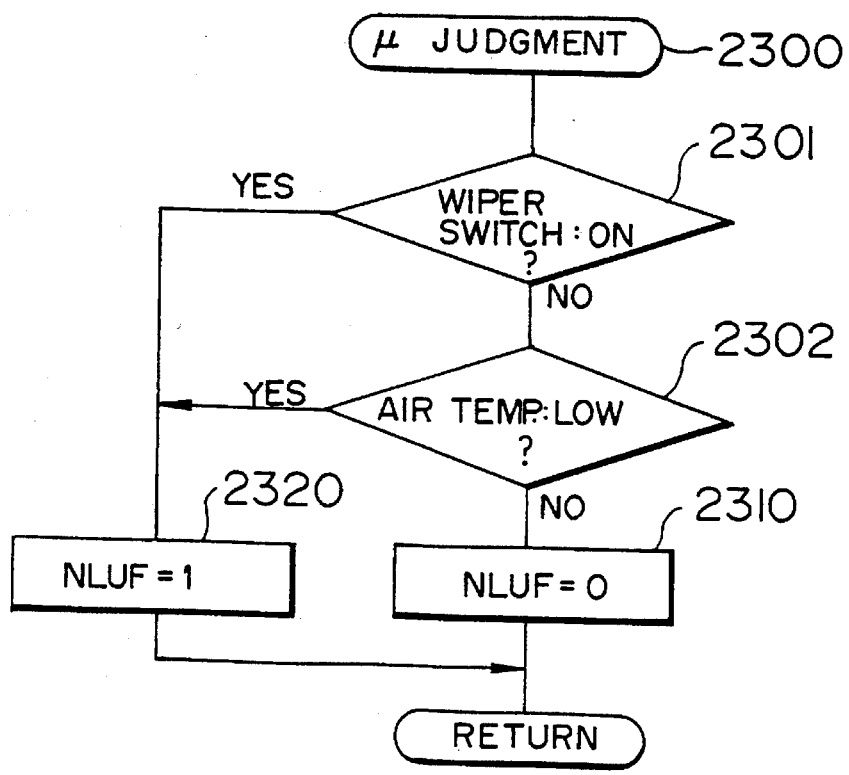
FIG. 21 is a flowchart for the processing procedure of a road surface μ judgment processing which is executed as a subroutine for the lock-up control shown in FIG. 19.

In the road surface μ judgment portion 1036, the road surface μ judgment processing routine 2300 shown in FIG. 21 is executed on the basis of the state WP of the wiper switch 1029 and the suction temperature information THA output from the suction temperature sensor 1021, thereby judging the road surface state on which the vehicle runs currently.

That is, in the routine 2300 shown in FIG. 21, the road surface μ judgment portion 1036 takes in the information on the state WP of the wiper switch 1029 and the suction temperature information THA from the suction temperature sensor 1021, and it judges the road surface to be a low μ road state, that is, a state that the friction coefficient μ of the road surface is small if the wiper switch 1029 is on, that is, it rains or snows currently (step 2301), or if the wiper switch 1029 is off, but the suction temperature ThA (outside air temperature) is lower than a predetermined temperature (for example, 5° C.), that is, it is judged that the vehicle runs on a snow road or the like (step 2302). Therefore, it sets "1" to a flag NLUF for inhibiting a lock-up release timing control as described later (step 2320). On the other hand, if the above conditions are not satisfied, it judges the road surface to be an usual road surface, and sets "0" to the flag NLUF (step 2310). Thereafter, the road surface μ judgment portion 1036 returns the set content of the flag NLUF "1" or "0" to the lock-up control portion 1033.

The lock-up control portion 1033 to which the flag NLUF is returned as described above further executes the following control operations through the lock-up control routine 2000 shown in FIG. 19. That is, if the content of the flag NLUF is "1" (step 2400), the lock-up mechanism 1017a is set to the on (joint) state (step 2510) under the condition that the idle switch 1027 is in the off state (step 2500). On the other hand, if the idle switch 1027 is switched on (step 2500) in the state where the content of the flag NLUF is "1", the lock-up mechanism 1017a is immediately set to the off (joint release) state (step 2600). Through the execution of these control operations, on low μ roads such as a rainy road, a snow road, etc., even when the lock-up mechanism 1017a is set to the on state, it is immediately switched to the off state when the quick braking operation is carried out. Accordingly, the engine stall due to the quick braking on the low μ roads can be excellently avoided.

In the lock-up control routine 2000, the lock-up control portion 1033 to which the flag NLUF is returned sets lock-up mechanism 1017a to the on (joint) state (step 2700) if the content of the flag NLUF is "0" (step 2400), and then it shifts to a processing of controlling the lock-up mechanism release timing (step 2800). The control of the release timing is executed by the release timing control portion 1037 in the control device 1030 shown in FIG. 16.

Figure 22:
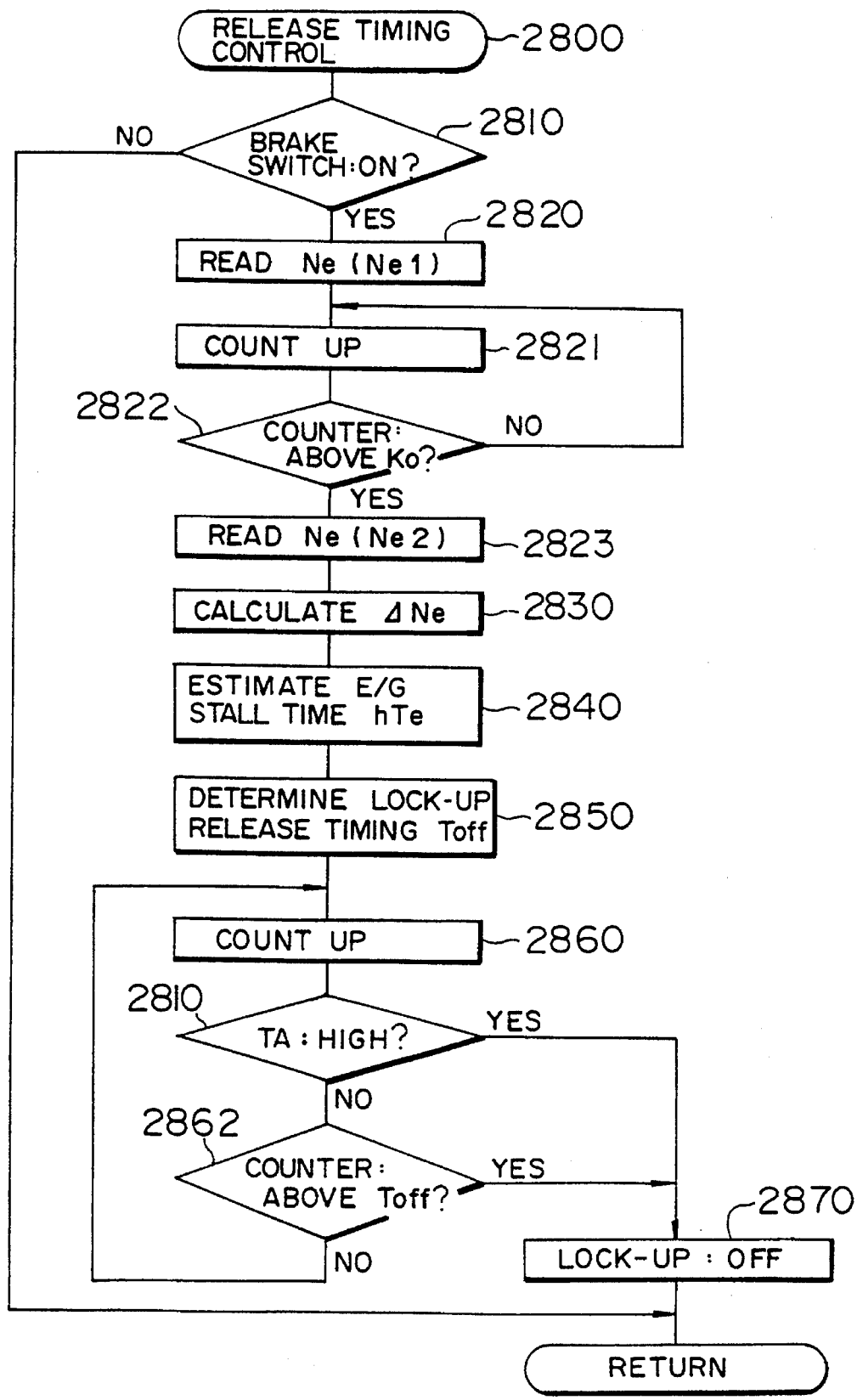
FIG. 22 is a flowchart for the control procedure of a release timing control which is executed as a subroutine of the lock-up control shown in FIG. 19.

In the release timing control portion 1037, the release timing control routine 2800 shown in FIG. 22 is executed on the basis of the state BR of the brake switch 1028 and the rotating number information Ne output from the rotating number sensor 25 to determine the release timing of the lock-up mechanism 1017a which is switched on.

That is, in the routine 2800 shown in FIG. 22, the release timing control portion 1037 executes the following processing if the brake pedal is stepped on and the brake switch 1028 is switched on (step 2810).

(1) A deceleration rate ΔNe of the vehicle is calculated on the basis of variation of the engine rotating number Ne after a predetermined time elapses from the step-on of the brake pedal. The calculation is performed by a ΔNe calculating portion 371 (FIG. 16).

That is, the engine rotating number Ne when the brake pedal is stepped on is read in (step 2820). Thereafter, the engine rotating number Ne is read in again (step 2823) after a count processing corresponding to the predetermined time (step 2821 and 2822), and the following calculation is performed (step 2830):

$$\Delta Ne = |Ne2 - Ne1|/A \text{ (rpm/msec)}$$

Here, A represents a prescribed time which corresponds to a value Ko of a counter, Ne1 represents the rotating number Ne when the brake pedal is stepped on, and Ne2 represents the rotating number Ne after the prescribed time A elapses.

(2) On the basis of the engine rotating number when the brake pedal is stepped on, the limit rotating number at which the engine is stopped, and the calculated deceleration rate is estimated a time the from the time when the braking is started till the time when the engine reaches a stop area. This estimation is executed by an the estimating portion 372 (FIG. 16).

That is, representing the limit rotating number (at which the engine is stopped) by Nes, the following calculation is performed on the basis of the engine rotating number Ne1 when the brake pedal is stepped on and the calculated deceleration rate ΔNe (step 2840):

$$hTe = (Ne1 - Nes)/\Delta Ne \text{ (msec)}$$

The limit rotating number Nes at which the engine is stopped is a constant, and it is substantially equal to 200 rpm.

(3) On the basis of the difference between the estimated engine stall area reaching time the and the perfect release time, the joint release timing Toff for the lock-up mechanism is determined. This determination is performed by a Toff calculation portion 373 (FIG. 16).

That is, representing the perfect release time of the lock-up mechanism 1017a by To, the following calculation is performed on the basis of the estimated engine stop area reaching time the (step 2850):

$$Toff = hTe - To - A - \alpha \text{ (msec)}$$

In the lock-up mechanism 1017a, a response delay usually occurs due to oil pressure or the like until the lock-up mechanism is perfectly released. Accordingly, by subtracting the response delay from the estimated engine stop area reaching time the, the maximum lock-up period in which no engine stall is induced can be ensured. In the above equation, α represents a margin.

In this equation, A represents a prescribed time used for the calculation of the deceleration rate ΔNe (the time corresponding to the value Ko of the counter), and the obtained release timing Toff corresponds to the period from the above prescribed time until the output of the lock-up release instruction.

(4) A release signal is generated on the basis of the release timing thus determined, and the release of the lock-up is instructed to the lock-up control portion 1033. This process is performed by a release signal generating portion 374 (see FIG. 16).

That is, the count processing corresponding to the release timing Toff thus determined is executed (steps 2860 and 2862), and the lock-up release instruction is output to the lock-up control portion 1033 when the count value reaches the time Toff (step 2870).

During this time, the release signal generating portion 374 monitors the throttle opening degree TA which is output through the throttle opening degree sensor 1022 (step 2861). When the throttle opening degree TA is above a predetermined value, the lock-up release instruction is output to the lock-up control portion 1033 preferentially to the release timing Toff (step 2870). With this process, even when a re-acceleration operation is carried out during a period from the step-on of the brake pedal until the switch-off of the lock-up mechanism 1017a, the lock-up mechanism 1017a is urgently released. Therefore, the acceleration performance is not deteriorated.

Figure 23:
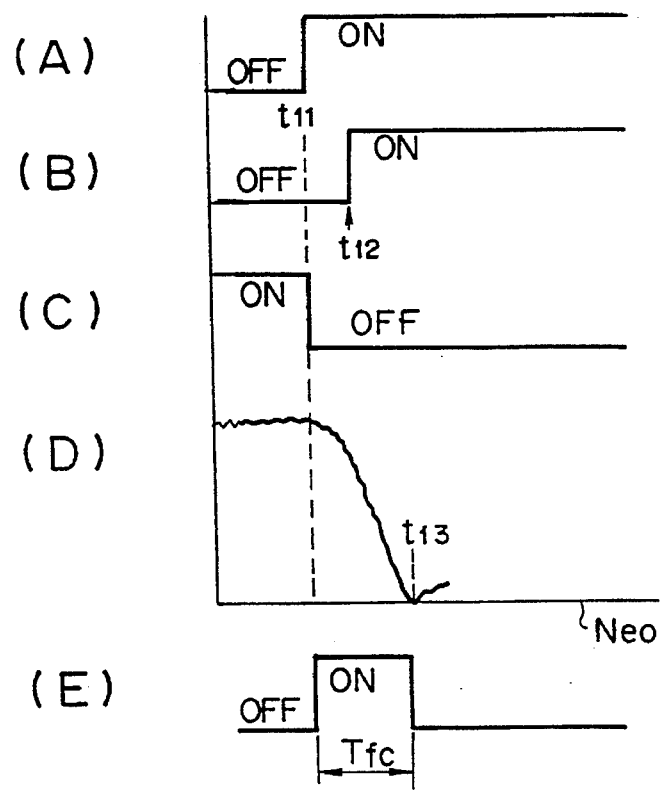
FIG. 23 is a timing chart for a conventional general lock-up control operation for releasing the lock up in synchronism with a switch-on of an idle switch, and a fuel cut control operation.

The on/off control of the lock-up mechanism 1017a is performed by the lock-up control portion 1033 and the release timing control portion 1037 as described above, so that the fuel cut period Tfc can be set to a longer value in the control mode shown in FIG. 14 as compared with that in the control mode shown in FIG. 23.

FIG. 23 shows an execution mode of the lock-up control for releasing the lock-up mechanism 1017a in synchronism with the switch-on of the idle switch 1027 and the fuel cut control which have been hitherto generally performed, and in this case, the following control mode is performed.

* The lock-up mechanism (clutch) which is assumed to be in the on-state is switched off at the time t11 of the idle switch shown in (C) of FIG. 23.
* Accordingly, when the brake pedal is afterwards stepped on and the brake switch is switched on at the time t12, the engine rotating number Ne is quickly lowered as shown in (D) of FIG. 23, and it reaches the fuel cut returning rotating number Neo at the time t13.
* Therefore, the fuel cut is executed only during the period from the time t11 until the time t13, and the period Tfc becomes very short as shown in (E) of FIG. 23.

As compared with the conventional control mode, the control system of this embodiment has the following control mode.

Figure 24:
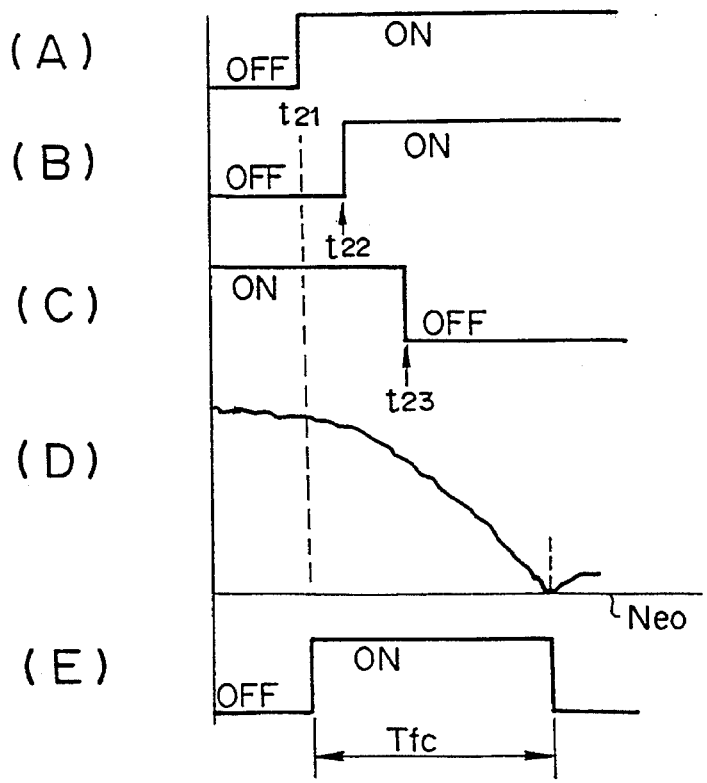
FIG. 24 is a timing chart for the lock-up control operation and the fuel cut control operation by the device of the fourth embodiment.

* As shown in (A) through (C) of FIG. 24, the lock-up mechanism (clutch) 1017a which is controlled to be in the on-state is kept in the on-state even when the idle switch 1027 is switched on at the time t21 or the brake switch 1028 is switched on at the time t22. The lock-up mechanism (clutch) 1017a is finally switched off at the time t23 when (the predetermined time A+the time corresponding to the release timing Toff) elapses from the time t22 when the brake switch 1028 is switched on.
* Therefore, as shown in (D) of FIG. 24, even when the brake pedal is stepped on, the engine rotating number Ne is hard to be lowered, and thus it finally reaches the fuel cut returning rotating number Neo at the time t24.
* That is, in this case the fuel cut is carried out over the period from the time t21 until the time t24, and thus the period Tfc can be sufficiently lengthened as shown in (E) of FIG. 24.

As described above, according to the vehicle control system of this embodiment, the joint period of the lock-up mechanism 1017a is lengthened at maximum and with high reliability in accordance with the driving state of the vehicle on real time basis. Therefore, during this period, the fuel cut period would be necessarily lengthened if the vehicle is in the fuel cut state, and thus the fuel consumption can be improved.

Further, according to the control system of this embodiment,

* even when the quick braking is carried out on a road surface having extremely low friction coefficient μ such as a rain road, a snow road or the like, the engine stall due to the quick braking or the like can be excellently avoided.
* In addition, the following effect can be obtained. That is, even when the re-acceleration is carried out during the period from the step-on of the brake pedal until the release of the joint of the lock-up mechanism, the acceleration performance is not deteriorated.

In the control system of this embodiment, the fuel cut returning rotating number Neo is fixed, and the fuel cut period is set on the basis of the comparison between the fixed fuel cut returning rotating number Neo and the engine rotating number Ne. However, the fuel cut returning rotating number Neo may be variable on the basis of the vehicle deceleration rate on real-time basis. Therefore, the fuel cut period can be expected to be further lengthened.

Figure 25:
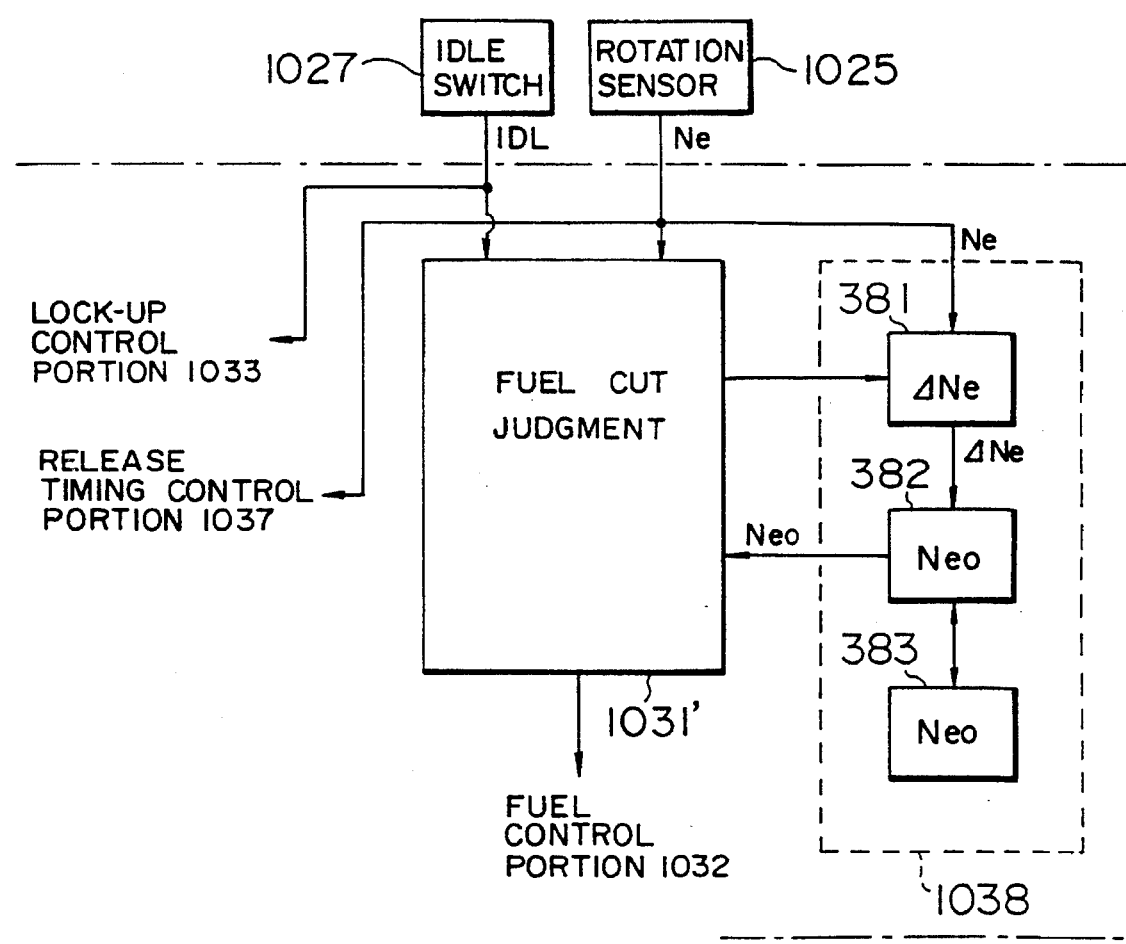
FIG. 25 is a block diagram showing the detailed construction of the control system of another embodiment.

FIG. 25 shows another embodiment of the vehicle control system of this invention in which the fuel cut returning rotating number Neo can be set variably.

As shown in FIG. 25, the control system of this embodiment includes a returning rotating number control portion 1038, and the fuel cut returning rotating number Neo which is set variably through the control portion 1038 is given to a fuel cut judgment portion 1031'. In FIG. 25, the other elements constituting the control system are identical to those of the control system shown in FIG. 16, and the duplicate description of these elements is omitted for brevity.

The returning rotating number control portion 1038 has a ΔNe calculation portion 381 for calculating the deceleration rate ΔNe of the vehicle and an Neo calculation portion 382 for calculating the fuel cut returning rotating number Neo with an Neo map 383 on the basis of the calculated deceleration rate ΔNe. In the fuel cut judgment portion 1031', the fuel cut processing routine shown in FIG. 26 is executed in cooperation with the returning rotating number control portion 1038.

Figure 26:
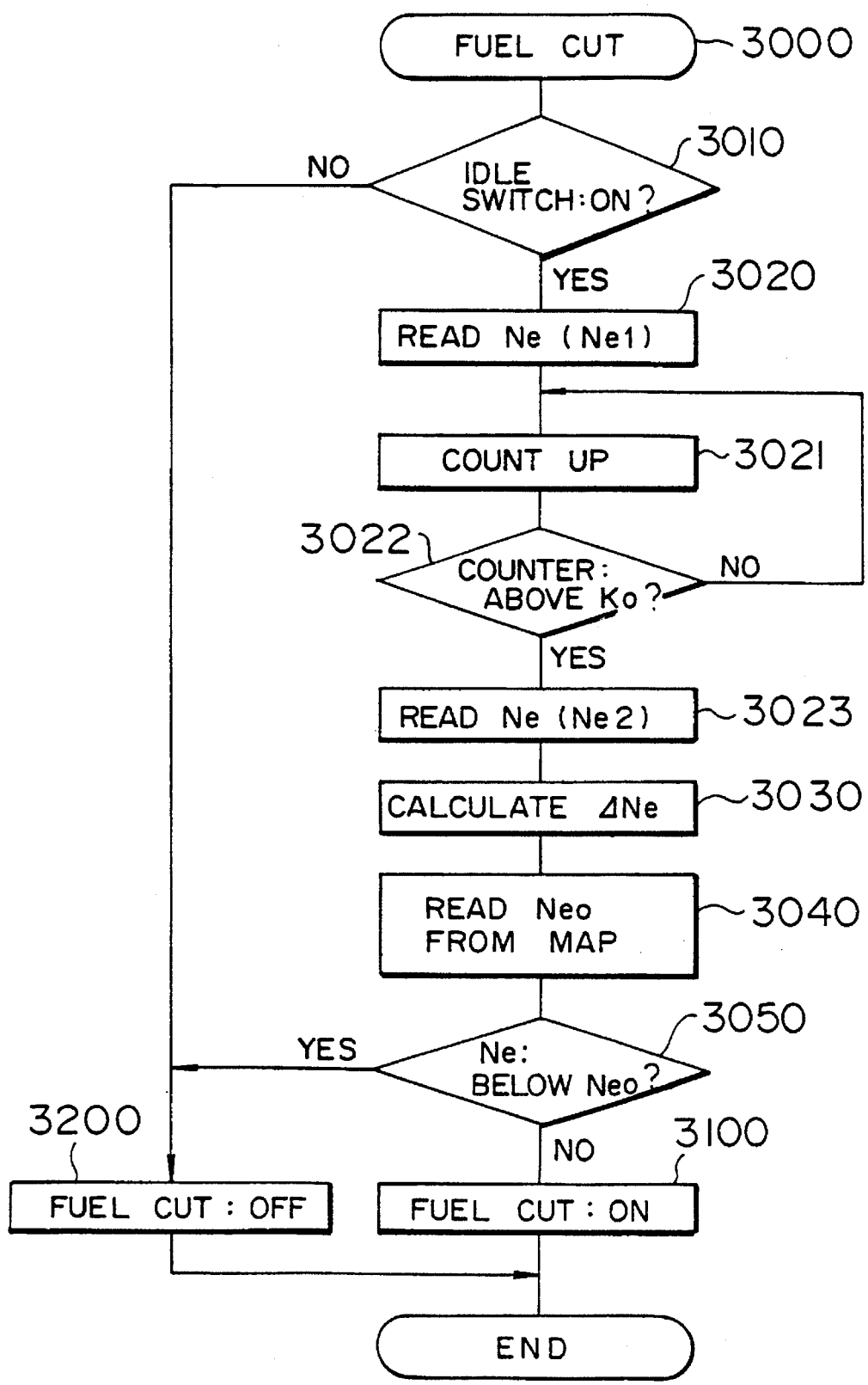
FIG. 26 is a flowchart for the control procedure of a fuel cut processing by the device of the embodiment shown in FIG. 25.

That is, in the fuel cut processing routine 3000 shown in FIG. 26, the following processing is executed in the fuel cut judgment portion 1031' and the returning rotating number control portion 1038 under the condition that the idle switch 1027 is switched on.

(1) Calculation of the deceleration rate ΔNe of the vehicle on the basis of the variation of the engine rotating number after a predetermined time elapses from the time when the vehicle is set to the idle state.

That is, the engine rotating number Ne when the idle switch 1027 is switched on is read in (step 3020), and the engine rotating number Ne is read in again (sep 3023) after the count processing corresponding to a prescribed time (step 3021 and 3022), and the following calculation is executed (step 3030):

$$\alpha Ne = |Ne2 - Ne1|/B \text{ (rpm/msec)}$$

Here, B represents a prescribed time corresponding to the value Ko, Ne1 represents a rotating number Ne when the idle switch is switched on, and Ne2 represents a rotating number Ne after the prescribed time elapses.

Figure 27:
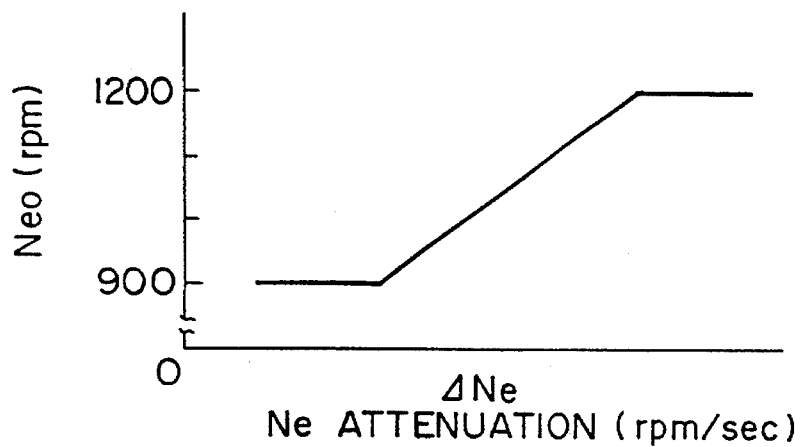
FIG. 27 is a graph showing a map used to set a fuel cut restoration rotating number in the fuel cut processing of the device of the embodiment.

(2) Calculation of the optimum value of the fuel cut returning rotating number Neo on the basis of the calculated deceleration rate ΔNe In this calculation, the fuel cut returning rotating number Neo corresponding to the calculated deceleration rate ΔNe is read out from the map 383 in which the fuel cut returning number Neo corresponding to the deceleration rate ΔNe is registered in a mode shown in FIG. 27 (step 3040). The fuel cut returning rotating number Neo of 900 to 1200 rpm is read out in proportion to a prescribed range of the deceleration rate ΔNe from the Neo map 383.

(3) The on/off of the fuel cut is judged through comparison between the read-out fuel cut returning rotating number Neo and the engine rotating number Ne every time Neo is read out.

That is, if the comparison result (step 3050) shows that the engine rotating number Ne exceeds the fuel cut returning rotating number Neo, the fuel cut judgment portion 1031' judges that the fuel cut should be executed and instructs "fuel cut: On" to the fuel control portion 1032 (step 3100). If the idle switch 1027 is not on, or if the idle switch 1027 is switched on, but the engine rotating number Ne is below the read-out fuel cut returning rotating number Neo, the fuel cut judgment portion 1031' instructs "fuel cut: off" to the fuel control portion 1032 (step 3200).

FIG. 26 shows an execution mode of the lock-up control and the fuel cut control by the control system shown in FIG. 25.

Figure 28:
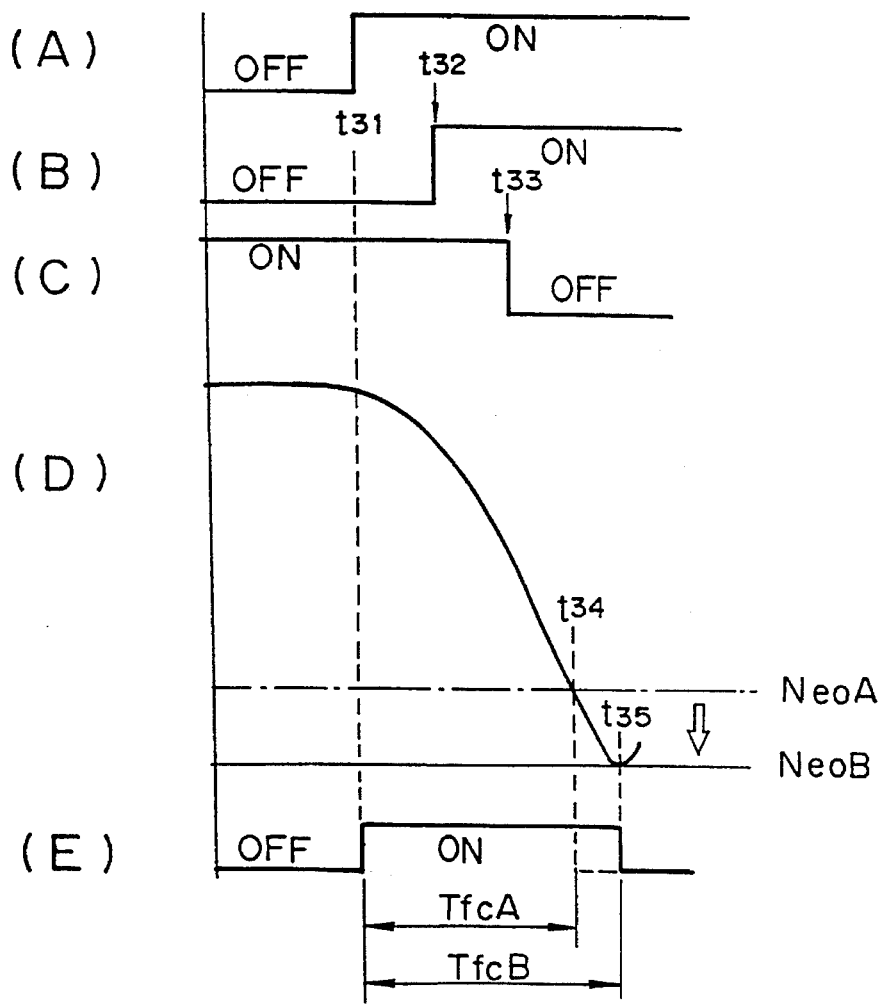
FIG. 28 is a timing chart for a lock-up control operation and a fuel cut control operation by the device of the embodiment.

According to the control system, particularly as shown in (D) and (E) of FIG. 26, the value of the fuel cut returning rotating number Neo is variably set to a value between a value NeoA (1200 rpm) and a value NeoB (900 rpm) in accordance with the deceleration rate ΔNe at the switch-on time of the idle switch of the vehicle. That is, the deceleration rate ΔNe is set as follows: if the deceleration rate ΔNe is large, like the previous embodiment, the fuel cut returning rotating number Neo is set to NeoA (1200 rpm) if when the deceleration rate ΔNe is small, the fuel cut returning rotating number Neo is reduced to NeoB (900 rpm) at maximum. Therefore, as usual cases, the control state of the vehicle is returned from the fuel cut state at the time t34 when the engine rotating number Ne reaches the fuel cut returning rotating number NeoA. On the other hand, if the deceleration rate ΔNe is small, the returning timing is extended until the time t35 when the engine rotating reaches the fuel cut returning rotating number NeoB. The extension of the returning timing also lengthens the fuel cut period Tfc from TfcA to TfcB shown in (E) of FIG. 24. In (A) through (C) of FIG. 28, the timing t31 when the idle switch 27 is switched on, the timing t32 when the brake switch 28 is switched on and the timing t33 when the lock-up mechanism (clutch) 1017a is switched off are illustrated as corresponding to the timings t21 to t23 in the control system of the previous embodiment shown in FIG. 24.

As described above, according to the control system of the embodiment shown in FIG. 25, the fuel cut returning rotating number Neo can be also suitably reduced within such a range that the engine stall is not induced, and the fuel cut period can be further lengthened.

In the control system shown in FIG. 25, the optimum value for the fuel cut returning rotating number Neo which corresponds to the vehicle deceleration rate ΔNe is calculated using the Neo map 383, however, any calculation manner may be used. For example, a function operation may be executed on the basis of the vehicle deceleration rate ΔNe every time it is obtained, whereby the optimum value of the fuel cut returning rotating number Neo is calculated.

Further, in the control system shown in FIG. 25,

* the deceleration rate based on the variation of the engine rotating number after the prescribed time elapses from the time when the vehicle is set to the idle state is calculated as the vehicle deceleration rate ΔNe, and the optimum value for the fuel cut returning rotating number Neo is calculated on the basis of the calculated idle deceleration rate.

* Alternately, like the previous embodiment, the braking deceleration rate based the engine rotating number variation after the prescribed time elapses from the time when the brake pedal is stepped on may be calculated as the vehicle deceleration rate ΔNe to calculate the optimum value for the fuel cut returning rotating number Neo on the basis of the calculated braking deceleration rate. In this construction, the fuel cut period can be further lengthened according to the control mode as described above.

The control system shown in FIG. 25 itself can lengthen the fuel cut period to some extent even if the lock-up control operation of the control system of the previous embodiment is not used. In this case, the equipments such as the lock-up control portion 1033, the release timing control portion 1037, etc. are not required to be provided.

Further, in all the embodiments as described above, the idle switch 1027 is provided to the acceleration pedal, and the on/off operation of the idle switch 1027 is detected to perform the fuel cut control and the lock-up control. However, if the control system of these embodiments is applied to a vehicle which is separately equipped with a sensor for detecting an operation amount of the acceleration pedal, that is, the opening degree of the acceleration, the idle switch 1027 may be omitted. In this case, for example, the on/off of the idle state is detected in a control mode that "idle:on" is instructed for the acceleration opening degree below 8°. However, if the throttle valve 1014 is designed to be interlocked with the acceleration pedal like the above embodiments, the on/off of the idle state may be detected on the basis of the throttle opening degree TA which is detected through the throttle opening degree sensor 1022.

As described above, according to the present invention, the release timing after the lock-up mechanism is set to the joint state is determined according to the following procedure:

* the deceleration rate of the vehicle is calculated on the basis of the variation of the engine rotating number after the prescribed time elapses from the time when the brake pedal is stepped on,

* the time period from the time when the braking operation is started until the time when the engine reaches the stop area is estimated on the basis of the engine rotating number when the brake pedal is stepped on, the limit rotating number when the engine is stopped and the calculated deceleration rate, and then

* the joint release timing for the lock-up mechanism is determined on the basis of the difference between the estimated engine stop area reaching time and the perfect release time of the lock-up mechanism.

Therefore, the joint period of the lock-up mechanism can be extended at maximum and with high reliability in accordance with every driving state of the vehicle, and thus if the vehicle is in the fuel cut state during the above period, the fuel cut period itself can be lengthened.

Furthermore, according to the present invention, if the friction coefficient μ of the load surface on which the vehicle currently runs is judged to be below the predetermined value, the joint of the lock-up mechanism is urgently released preferentially to the release timing under the condition that the vehicle is to the idle state. Therefore, even when the quick braking operation is conducted on the road surface having extremely low friction coefficient μ such as the rain road, the snow road or the like, the engine stall due to the quick braking, or the like can be excellently avoided.

Still furthermore, according to the present invention, when the acceleration opening degree or the throttle opening degree of the vehicle is judged to be above the predetermined value, the joint of the lock-up mechanism is urgently released preferentially to the determined release timing. Therefore, even when the re-accelerating operation is conducted during the period from the time when the brake pedal is stepped on until the time when the joint of the lock-up mechanism is released, the acceleration performance is not deteriorated.

In addition, according to the present invention, the optimum value can be set for the fuel cut returning rotating number on the basis of every deceleration rate. Therefore, the fuel cut returning rotating number can be suitably reduced within such a range that no engine stall is induced, and in addition the fuel cut period can be further extended.

What is claimed is:

1. A control system for an automotive vehicle equipped with an automatic transmission, comprising:
   brake operation detecting means for detecting a step-on operation of a brake pedal;
   lock-up control means for instructing a lock-up to an automatic transmission under a prescribed driving condition to lock up a torque converter of said automatic transmission, and instructing a lock-up release to said automatic transmission at least when a step-on operation of a brake pedal is detected by said brake operation detecting means to release the lock-up of said torque converter; and
   air suction amount increasing means for increasing an air suction amount of an internal combustion engine by a predetermined amount on the basis of the lock-up instruction of said lock-up control means, and stopping the increase of the air suction amount after a prescribed time elapses when the lock-up release instruction is output from said lock-up control means.

2. The control system as claimed in claim 1, wherein said air suction amount increasing means controls an opening and closing operation of at least one of a throttle valve of said internal combustion engine, an idle speed control valve provided in a bypass for bypassing said throttle valve, a purge control valve provided in an introducing passage for introducing fuel vapor gas occurring in a fuel tank into an air suction pipe of said internal combustion engine, and an EGR valve provided in a recirculating passage for recirculating exhaust gas of said internal combustion engine into said air suction pipe.

3. The control system as claimed in claim 1, further comprising:
   idle rotation control means for controlling an opening and closing operation of an idle speed control valve which is provided in a bypass for bypassing a throttle valve of said internal combustion engine in accordance with a driving state of said internal combustion engine, wherein said air suction amount increasing means includes:
   opening degree setting means for setting the opening degree of said idle speed control valve on the basis of the lock-up instruction of said lock-up control means; and
   opening and closing control means for comparing the opening degree set by said opening degree setting means with the control opening degree of said idle speed control valve by said idle rotation control means, and controlling the opening and closing operation of said idle speed control valve so that the opening degree of said idle speed control valve is equal to the opening degree set by said opening degree setting means when the opening degree set by said opening degree setting means is larger than the opening degree of said idle speed control valve.

4. A control system for an automotive vehicle equipped with an automatic transmission, comprising:
   brake operation detecting means for detecting a step-on operation of a brake pedal;
   lock-up control means for instructing a lock-up to an automatic transmission under a prescribed driving condition to lock up a torque converter of said automatic transmission, and instructing a lock-up release to said automatic transmission to release the lock-up of said torque converter at least when the step-on operation of the brake pedal is detected by said brake operation detecting means; and
   air-fuel mixture increasing means for increasing air-fuel mixture to be supplied into an internal combustion engine by a prescribed time when the lock-up release instruction is output from said lock-up control means.

5. The control system as claimed in claim 4, wherein said air-fuel mixture increasing means increases the air-fuel mixture by controlling the opening and closing operation of at least one of a purge control valve provided in an introducing passage for introducing fuel vapor gas occurring in a fuel tank into an air suction pipe of said internal combustion engine, and an EGR valve provided in a recirculating passage for recirculating exhaust gas of said internal combustion engine into said air suction pipe.

6. The control system as claimed in claim 4, further icomprising:
   judgment means for judging whether a road surface on which a vehicle runs currently is slippery; and
   actuation restricting means for actuating said air suction amount increasing means or said air-fuel mixture increasing means only when the road surface is judged to be slippery by said judgment means.

7. A vehicle control system having an automatic transmission equipped with a lock-up mechanism comprising:
   fuel cut means for cutting fuel supply into an engine while an engine rotating number at a vehicle deceleration time is above a fuel cut returning rotating number, the lock-up mechanism being set to a joint state under a prescribed condition to thereby extend a fuel supply cut period by said fuel cut means;
   brake deceleration rate calculating means for calculating a brake deceleration rate of the vehicle on the basis of variation of an engine rotating number after a prescribed time elapses from the time when a brake pedal is stepped on;
   estimating means for estimating a time period from the time when the braking is started until the time when the engine reaches a stop area, on the basis of the engine rotating number when the brake pedal is stepped on, the limit rotating number when the engine is stopped and the calculated brake deceleration rate;
   release timing determining means for determining a joint release timing for said lock-up mechanism on the basis of the difference between the estimated engine stop area reaching time and the perfect release time of said lock-up mechanism; and control means for releasing the joint of said lock-up mechanism when the time reaches the determined release timing after the lock-up mechanism is set to a joint state under a prescribed condition.

8. The vehicle control system as claimed in claim 7, wherein said brake deceleration rate calculating means executes the following calculation to calculate $\Delta Ne$:

$$\Delta Ne = |Ne2 - Ne1|/A$$

where Ne1 represents the engine rotating number when the brake pedal is stepped on, Ne2 represents the engine rotating number after the prescribed time elapses, and A represents the prescribed time, said estimating means executes the following calculation to estimate the engine stop area reaching time hTe on the basis of the engine rotating number Ne1 when the brake pedal is stepped on and the calculated brake deceleration rate $\Delta Ne$:

$$hTe = (Ne1 - Nes)/\Delta Ne$$

where Nes represents the limit rotating number when the engine is stopped, and said release timing determining means executes the following calculation to determined the joint release timing Toff for said lock-up mechanism on the basis of the estimated engine stop area reaching time the and the prescribed time A used for the calculation of the brake deceleration rate $\Delta Ne$:

$$Toff = hTe - To - A - \alpha$$

where To represents the perfect release time of said lock-up mechanism and $\alpha$ represents a margin.

9. The vehicle control system as claimed in claim 7, further including:

road surface judgment means for judging whether a road surface on which a vehicle runs currently has a friction coefficient $\mu$ below a prescribed value; and idle detecting means for detecting whether the vehicle is in an idle state, wherein said control means urgently release the joint of said lock-up mechanism preferentially to the release timing when the friction coefficient $\mu$ of the road surface is judged to be below the prescribed value by said road surface judgment means and the vehicle is judged to be in the idle state by said idle detecting means.

10. The vehicle control system as claimed in claim 7, further comprising:

acceleration or throttle opening degree detecting means for detecting whether the acceleration opening degree of the vehicle or the throttle opening degree of the engine is above a prescribed value, wherein said control means urgently releases the joint of said lock-up mechanism preferentially to the determined release timing when the acceleration opening degree of the vehicle or the throttle opening degree of the engine is judged to be above the prescribed value by said acceleration or throttle opening degree detecting means.

11. The vehicle control system as claimed in claim 7, further comprising:

idle deceleration rate calculating means for calculating an idle deceleration rate of the vehicle on the basis of variation of the engine rotating number after a prescribed time elapses from the time when the vehicle is set to the idle state; and fuel cut returning rotating calculation means for calculating the optimum value for the fuel cut returning rotating number on the basis of the calculated idle deceleration rate, wherein said fuel cut means cuts the fuel supply into the engine while the engine rotating number at the vehicle deceleration time is above the calculated fuel cut returning rotating number.

12. The vehicle control system as claimed in claim 11, wherein said idle deceleration rate calculating means executes the following calculation to calculate the idle deceleration rate $\Delta Ne$:

$$\Delta Ne = |Ne2 - Ne1|/B$$

where Ne1 represents the engine rotating number when the vehicle is set to the idle state, Ne2 represents the engine rotating number after the prescribed time elapses, and B represents the prescribed time, and said fuel cut returning rotating number calculates the optimum value for the fuel cut returning rotating number as a value which is proportional to the calculated idle deceleration rate $\Delta Ne$.

* * * * *